(12) United States Patent
Ishii

(10) Patent No.: US 8,259,214 B2
(45) Date of Patent: Sep. 4, 2012

(54) IMAGE PICKUP APPARATUS AND AUTO-FOCUS DETECTION METHOD

(75) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 12/487,232

(22) Filed: Jun. 18, 2009

(65) Prior Publication Data

US 2010/0002127 A1 Jan. 7, 2010

(30) Foreign Application Priority Data

Jul. 4, 2008 (JP) ................................. 2008-175619

(51) Int. Cl.
  *G03B 13/00* (2006.01)
  *H04N 5/232* (2006.01)
(52) U.S. Cl. ...................................................... 348/345
(58) Field of Classification Search ........................ None
  See application file for complete search history.

(56) References Cited

U.S. PATENT DOCUMENTS

| 7,884,879 B2 * | 2/2011 | Miyazaki ...................... 348/364 |
| 2006/0182433 A1 | 8/2006 | Kawahara et al. |
| 2008/0013851 A1 * | 1/2008 | Ishiwata et al. ............... 382/255 |
| 2008/0037975 A1 * | 2/2008 | Nakajima ...................... 396/104 |
| 2008/0050108 A1 * | 2/2008 | Mizutani et al. ............... 396/104 |
| 2008/0252773 A1 * | 10/2008 | Oishi ............................ 348/347 |

FOREIGN PATENT DOCUMENTS

| JP | 2001-215403 | 8/2001 |
| JP | 2006-227080 | 8/2006 |
| JP | 2007-312249 A | 11/2007 |
| JP | 2008-022300 A | 1/2008 |
| JP | 2008-052123 A | 3/2008 |
| JP | 2009-059326 A | 3/2009 |
| JP | 2009-192774 A | 8/2009 |

* cited by examiner

*Primary Examiner* — Anthony J Daniels

(74) *Attorney, Agent, or Firm* — Cowan, Liebowitz & Latman, P.C.

(57) ABSTRACT

An image pickup apparatus capable of focusing on an object with stability based on a recognized object area. A video camera includes an image pickup device for picking up an image formed by an image-pickup optical system including a focus lens, a face detection processing circuit for detecting, based on a video signal output from the image pickup device, an object area on an imaging screen and the likelihood of an object being present in the object area, and a computer for controlling a focus adjustment based on the object area when determining that the likelihood detected by the face detection processing circuit satisfies a predetermined condition, which is varied according to an imaging state.

12 Claims, 18 Drawing Sheets

FIG. 4

| NUMERIC VALUE REPRESENTING RELIABILITY | CRITERION |
|---|---|
| 1 | TWO EYES, MOUTH, NOSE, AND EYEBROWS ARE CONFIRMED, AND OBJECT AREA HAS VERTICALLY LONG OVAL SHAPE AND IS WITHIN PREDETERMINED RANGE |
| 2 | TWO EYES, MOUTH, AND NOSE ARE CONFIRMED, AND OBJECT AREA HAS VERTICALLY LONG OVAL SHAPE AND IS WITHIN PREDETERMINED RANGE |
| 3 | TWO EYES AND MOUTH ARE CONFIRMED, AND OBJECT AREA HAS VERTICALLY LONG OVAL SHAPE AND IS WITHIN PREDETERMINED RANGE |
| ⋮ | ⋮ |
| 7 | ONE EYE IS CONFIRMED |

FIG. 5

| ZOOM MAGNIFICATION | LESS THAN 10 TIMES | NOT LESS THAN 10 TIMES |
|---|---|---|
| THRESHOLD VALUE | 1~3 (FIRST THRESHOLD VALUE) | 1~6 (SECOND THRESHOLD VALUE) |

*FIG. 8*

| SHUTTER SPEED | NOT SLOWER THAN 1/15 S | SLOWER THAN 1/15 S |
|---|---|---|
| THRESHOLD VALUE | 1~3 (THIRD THRESHOLD VALUE) | 1~6 (FOURTH THRESHOLD VALUE) |

FIG. 10

| IN-FOCUS DEGREE | 10~6 | 5~1 |
|---|---|---|
| THRESHOLD VALUE | 1~3 (FIFTH THRESHOLD VALUE) | 1~6 (SIXTH THRESHOLD VALUE) |

*FIG. 12*

| BRIGHTNESS | NOT LOW ILLUMINANCE | LOW ILLUMINANCE |
|---|---|---|
| THRESHOLD VALUE | 1~3 (SEVENTH THRESHOLD VALUE) | 1~6 (EIGHTH THRESHOLD VALUE) |

| ZOOM MAGNIFICATION | LESS THAN 10 TIMES | NOT LESS THAN 10 TIMES |
|---|---|---|
| THRESHOLD VALUE FOR CASE WHERE OBJECT ARER IS AWAY FROM SCREEN CENTER | 1~2 (NINTH THRESHOLD VALUE) | 1~5 (TENTH THRESHOLD VALUE) |

FIG. 17

| SHUTTER SPEED | NOT SLOWER THAN 1/15 S | SLOWER THAN 1/15 S |
|---|---|---|
| THRESHOLD VALUE FOR CASE WHERE OBJECT ARER IS AWAY FROM SCREEN CENTER | 1~2 (ELEVENTH THRESHOLD VALUE) | 1~5 (TWELFTH THRESHOLD VALUE) |

FIG. 20

| CAMERA OPERATION | ZOOMING OPERATION NOT BEING PERFORMED | ZOOMING OPERATION BEING PERFORMED |
|---|---|---|
| THRESHOLD VALUE | 1~3 (THIRTEENTH THRESHOLD VALUE) | 1~6 (FOURTEENTH THRESHOLD VALUE) |

IMAGE PICKUP APPARATUS AND AUTO-FOCUS DETECTION METHOD

BACKGROUND OF THE INVENTION

1. Field of the Invention

The present invention relates to an image pickup apparatus and an auto-focus detection method.

2. Description of the Related Art

For auto-focus (AF) control in an image pickup apparatus such as a video camera, a TV-AF system has been mainly used that generates an AF evaluation value signal representing the sharpness, contrast state, etc. of an image signal generated by an image pickup device and adjusts focus lens position so as to attain the maximum of the AF evaluation value signal.

When photographing a person with an image pickup apparatus that performs AF control, focusing is sometimes made not on the person (main object) but on the background depending on a state of contrast between the person and background. In that case, the focusing cannot be achieved as desired by the photographer, giving a discomfort to the photographer.

To obviate this, an image pickup apparatus has been proposed that recognizes a face in a picked-up image, sets a focus detection area including the recognized face, and performs focus detection based on the focus detection area (see, for example, Japanese Laid-open Patent Publication No. 2006-227080). Another image pickup apparatus has been proposed that detects a human face (especially eyes) in a picked-up image and performs focus detection based on the detected eyes (see, for example, Japanese Laid-open Patent Publication No. 2001-215403).

The resolution of picked-up image tends to be affected by an imaging state. With the aforementioned image pickup apparatuses, if hand-shake is caused at high zoom magnification photographing, the resolution of picked-up image is lowered to make it difficult to detect a face to be photographed.

If a face is not detected, focusing cannot be performed by the image pickup apparatuses, posing a problem that it becomes impossible to make focusing on the main object (face) even though the main object is present on the imaging screen.

In a case for example that face detection and non-detection are irregularly repeated depending on imaging state, focusing is made on a face when the face is detected but on the background when no face is detected, posing a problem that stable focusing on the object cannot be achieved.

SUMMARY OF THE INVENTION

The present invention provides an image pickup apparatus and an auto-focus detection method capable of achieving stable focusing on an object, even when focusing is performed based on a recognized object area.

According to a first aspect of this invention, there is provided an image pickup apparatus comprising an image pickup unit adapted to pick up an image and output a video signal, the image being formed by an image-pickup optical system including a focus lens, an object detection unit adapted, based on the video signal output from the image pickup unit, to detect object information that represents an object area on an imaging screen and likelihood of being an object, a determination unit adapted to determine whether the likelihood of being an object detected by the object detection unit satisfies a predetermined condition varied according to an imaging state, and a control unit adapted to control a focus adjustment based on a video signal in the object area in a case where it is determined by the determination unit that the likelihood of being an object satisfies the predetermined condition.

According to a second aspect of this invention, there is provided an auto-focus detection method comprising an image pickup step of picking up an image and outputting a video signal, the image being formed by an image-pickup optical system including a focus lens, an object detection step of, based on the video signal output in the image pickup step, detecting object information that represents an object area on an imaging screen and likelihood of being an object, a determination step of determining whether the likelihood of being an object detected in the object detection step satisfies a predetermined condition varied according to an imaging state of the image pickup apparatus, and a control step of controlling a focus adjustment based on a video signal in the object area in a case where it is determined in the determination step that the likelihood of being an object satisfies the predetermined condition.

With this invention, execution or non-execution of an object-area-based focus adjustment is controlled in accordance with whether the likelihood of an object being present in the object area satisfies a predetermined condition varied according to an imaging state, thereby achieving stable focusing on the object.

Further features of the present invention will become apparent from the following description of exemplary embodiments with reference to the attached drawings.

BRIEF DESCRIPTION OF THE DRAWINGS

FIG. 4 is a table showing an example correspondence between numeric value representing reliability of face detection result and criterion in accordance with which the reliability numeric value is set;

FIG. 5 is a table showing an example relation between zoom magnification and threshold value;

FIG. 8 is a table showing an example relation between shutter speed and threshold value;

FIG. 10 is a table showing an example relation between in-focus degree and threshold value;

FIG. 12 is a table showing an example relation between brightness and threshold value;

FIG. 17 is a table showing an example relation between shutter speed and threshold value for a case where an object area is away from the center of an imaging screen;

FIG. 20 is a table showing an example relation between execution/non-execution of zooming operation and threshold value.

DETAILED DESCRIPTION OF THE PREFERRED EMBODIMENTS

The present invention will now be described in detail below with reference to the drawings showing preferred embodiments thereof.

(First Embodiment)

Figure 1:
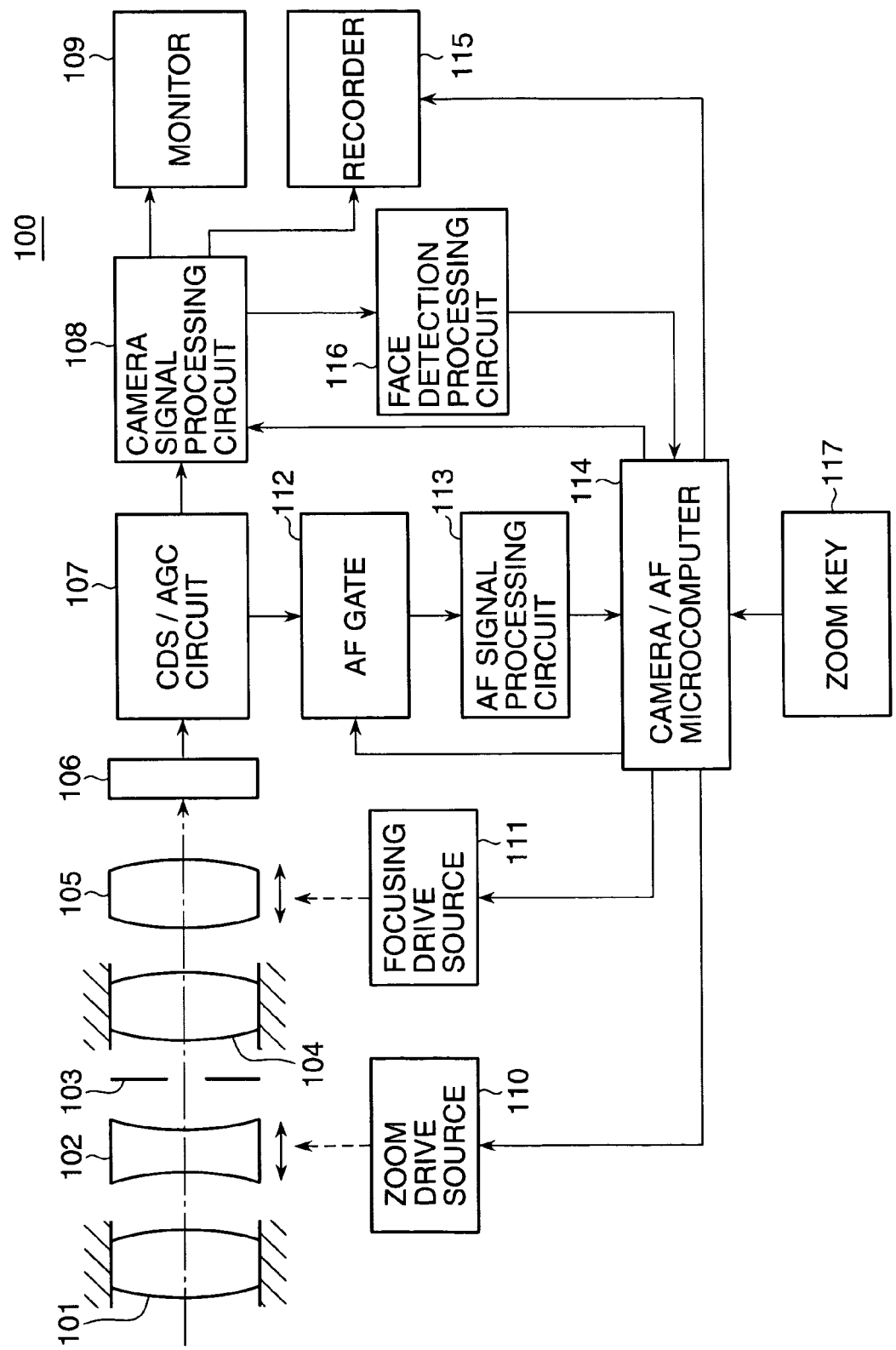
FIG. 1 is a block diagram schematically showing the overall construction of a video camera according to embodiments of this invention.

FIG. 1 schematically shows in block diagram the overall construction of a video camera 100 that functions as an image pickup apparatus according to embodiments of this invention.

As shown in FIG. 1, the video camera 100 includes a first fixed lens 101, a variable power lens 102 as a zoom lens movable along an optical axis to vary the magnification, an aperture 103, a second fixed lens 104, and a focus lens 105. The focus lens 105 is a so-called focus/compensator lens having both a focusing function and a function of compensating for a focal plane movement due to the alteration of magnification. An image-pickup optical system constituted by the first fixed lens 101, variable power lens 102, aperture 103, second fixed lens 104, and focus lens 105 generates and forms an optical image of an object field on an imaging screen of an image pickup device 106 (image pickup unit).

The image pickup device 106 is a photoelectric conversion device constituted by a CCD sensor or a CMOS sensor, converts the optical image formed on the device 106 into an electric signal, and outputs it to a CDS/AGC circuit 107 that samples the output of the image pickup device 106 and performs a gain adjustment.

The video camera 100 further includes a camera signal processing circuit 108, monitor 109, zoom drive source 110, focusing drive source 111, AF gate 112, AF signal processing circuit 113, camera/AF microcomputer 114, recorder 115, and face detection processing circuit 116.

The camera signal processing circuit 108 performs various image processing on an output signal from the CDS/AGC circuit 107 to generate a video signal. The monitor 109 is implemented by, e.g., an LCD motor, and displays as a picked-up image the video signal output from the camera signal processing circuit 108. The recorder 115 records the video signal output from the circuit 108 into a recording medium such as a magnetic tape, optical disk, or semiconductor memory.

The AF gate 112 only passes a signal within a focus adjustment area, among all the pixel output signals from the CDS/AGC circuit 107. The AF signal processing circuit 113 extracts a high-frequency component, a luminance difference component, etc. from the signal passed through the AF gate 112 to generate and output an AF evaluation value signal to the camera/AF microcomputer 114 (hereinafter referred to as the computer).

The luminance difference component is, e.g., a difference between the maximum and minimum values of luminance level of the signal passed through the AF gate 112. The AF evaluation value signal represents the sharpness of the image generated based on the output signal from the image pickup device 106. Since the sharpness varies according to a focus state of the image-pickup optical system, the AF evaluation value signal represents the focus state of the system.

The computer 114 (control unit) controls the entire video camera 100. Specifically, the computer 114 performs zoom control by controlling the zoom drive source 110 that drives the variable power lens 102 and also performs focus control by controlling the focusing drive source 111 that drives the focus lens 105. The zoom drive source 110 and the focusing drive source 111 are each constituted by an actuator such as a stepping motor, DC motor, vibration type motor, or voice coil motor. It should be noted that a conventional TV-AF system (hereinafter referred to as the TV-AF) can be used for the focus control by the computer 114.

As pieces of information representing an imaging state, the computer 114 acquires camera parameters, camera operations, and pieces of object information. The camera parameters include zoom magnification, focal distance, in-focus degree, etc. The camera operations include shutter speed, zooming operation, etc. The pieces of object information include object brightness (illuminance), etc.

The face detection processing circuit 116 (object detection unit) performs known face recognition processing on the video signal output from the camera signal processing circuit 108, thereby detecting a main object's face area on the imaging screen of the image pickup device 106, as an object area. The circuit 116 transmits to the computer 114 a detection result including object position information that represents the object area position on the imaging screen. Based on the received detection result, the computer 114 transmits to the AF gate 112 the object position information in accordance with which a focus detection area is set at the position on the imaging screen where the object face area is present.

As the known face recognition processing, there can be mentioned, e.g., a method for extracting a flesh-colored area based on color gradation represented by image data corresponding to the video signal and for detecting a face area based on the degree of matching with a face contour template prepared in advance. Another method is to detect a face area by extracting a face characteristic point such as eyes, nose, or mouth by a known pattern recognition technique. In this embodiment, the face recognition processing is not limited to using either of these methods and any known method may be used.

To notify the photographer of the face area recognized by the face detection processing circuit 116, the computer 114 transmits information such as the position and size of the face area to the camera signal processing circuit 108 and causes the monitor 109 to display on its display screen (imaging screen) a frame display corresponding to the information in such a manner that the frame display is superposed on the picked-up image.

The video camera 100 has a zoom key 117 operable by the photographer. In accordance with the manipulation on the zoom key 117, the computer 114 controls the zoom drive source 110 to move the variable power lens 102 to vary the zoom magnification.

Next, a focusing process (focus adjustment) according to a first embodiment of this invention is described with reference to FIG. 2.

Figure 2:
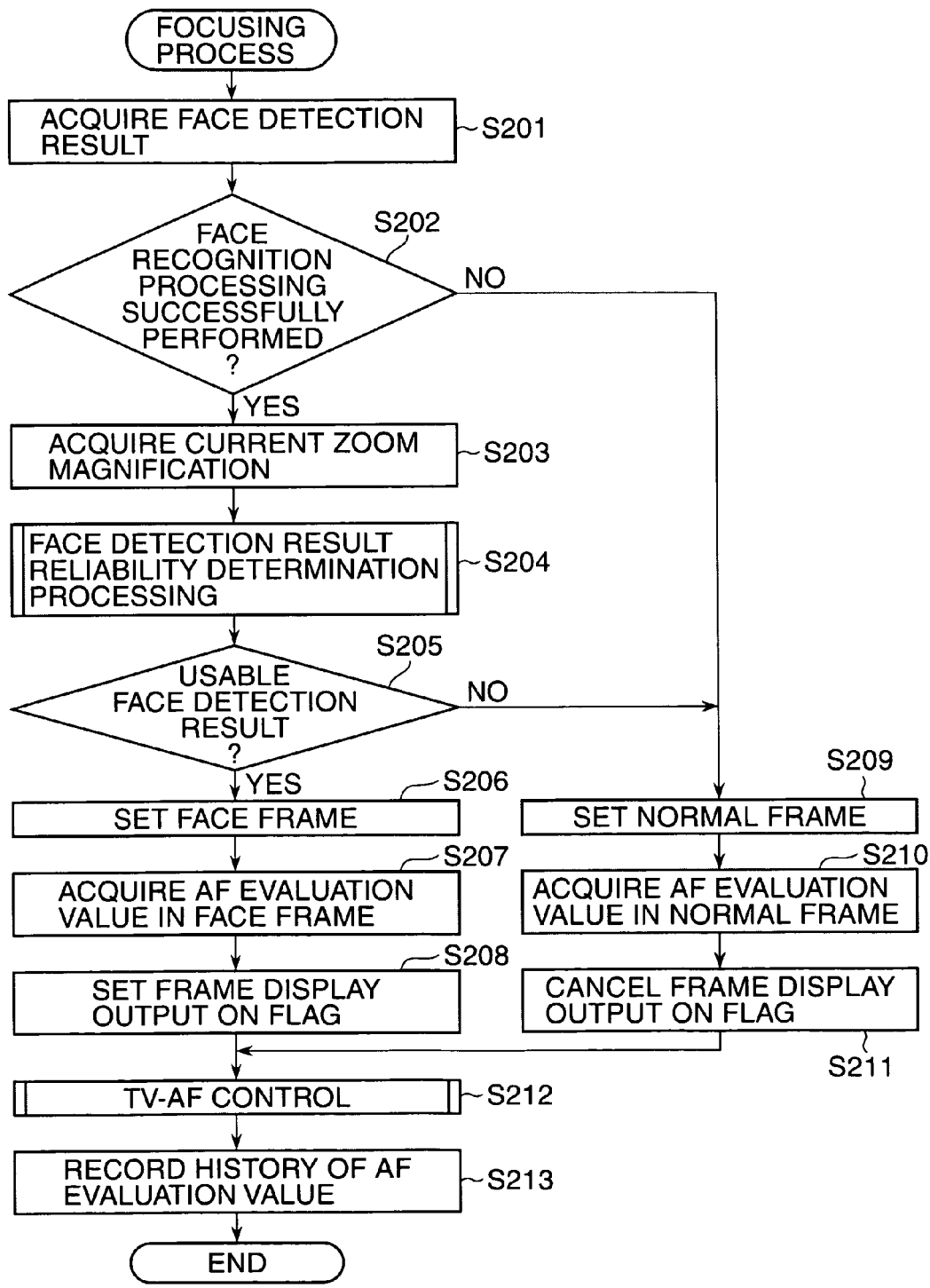
FIG. 2 is a flowchart showing the procedure of a focusing process according to a first embodiment of this invention, which is carried out by the video camera.

FIG. 2 shows in flowchart the procedures of the focusing process according to the first embodiment executed by the video camera 100. The focusing process is to perform AF control and frame display control according to zoom magnification. The focusing process is performed by a CPU (not shown) in accordance with a computer program stored in the computer 114. It should be noted that the focusing process is repeatedly executed, e.g., at intervals of a readout cycle in which electrical signal is read from the image pickup device 106 for field image formation on a per field basis.

The focusing process in FIG. 2 is started, e.g., upon turn-on of a power source (not shown) of the video camera 100. In accordance with an instruction from the computer 114, the face detection processing circuit 116 performs known face recognition processing on a picked-up image corresponding to the video signal. The computer 114 acquires a face detection result of the face recognition processing (step S201).

Next, the computer 114 determines whether a face area is present in the acquired face detection result (picked-up image) to determine whether the face recognition processing has been successfully performed (step S202).

If it is determined that the face recognition processing has been performed successfully (YES to step S202), the computer 114 acquires a current zoom magnification (step S203). Based on the acquired magnification, the computer 114 performs face-detection-result reliability determination processing (refer to FIG. 3) to determine whether the face detection result can be usable for the AF control and frame display control (step S204).

If it is determined based on a result of the reliability determination processing in step S204 that the face detection result is usable (YES to step S205), a predetermined AF frame (hereinafter referred to as the face frame) that moves to follow a main object including the recognized face area is set to the AF gate 112 (step S206). Next, the computer 114 acquires an AF evaluation value in the face frame (step S207) and sets a frame display output ON flag (step S208).

When the frame display output ON flag is set, a frame is displayed at the position of the face area of the main object (main object person) on the display screen of the monitor 109, to enable the photographer to recognize the in-focused position on the picked-up image. In this embodiment, to set the position of the AF frame or the frame display, the computer 114 acquires the position information representing the face area position on the image screen in respect of the face area recognized by the face recognition processing by the face detection processing circuit 116. Alternatively, the center position of the face area or the position of a face characteristic point such as eyes, nose, or mouth may be used as the position information. After the frame display output ON flag being set, the process proceeds to step S212.

On the other hand, if it is determined that the face recognition processing has not been successfully performed (NO to step S202) or that the face detection result is not usable (NO to step S205), the computer 114 sets to the AF gate 112 a predetermined AF frame for normal focusing control (hereinafter referred to as the normal frame), which does not move to follow the main object (step S209). It should be noted that the normal frame is not limited to one in number and a plurality of normal frames may be set. Next, the computer 114 acquires an AF evaluation value in the normal frame (step S210), cancels the frame display output ON flag (step S211), and proceeds to step S212.

In step S212, the computer 114 carries out known TV-AF control using the acquired AF evaluation value. The known TV-AF control is to drive the focus lens 105 such that the AF evaluation value has its maximum value, while monitoring the AF evaluation value, to thereby attain an in-focus state. The TV-AF control includes control to maintain the in-focus state. For example, a determination is carried out as to whether a reduction in AF evaluation value takes place, thereby determining the necessity of driving the focus lens 105 after the in-focus state has once been attained.

After executing the TV-AF control, the computer 114 stores AF evaluation values to record a history of AF evaluation value for the next TV-AF control (step S213), and completes the focusing process.

Figure 3:
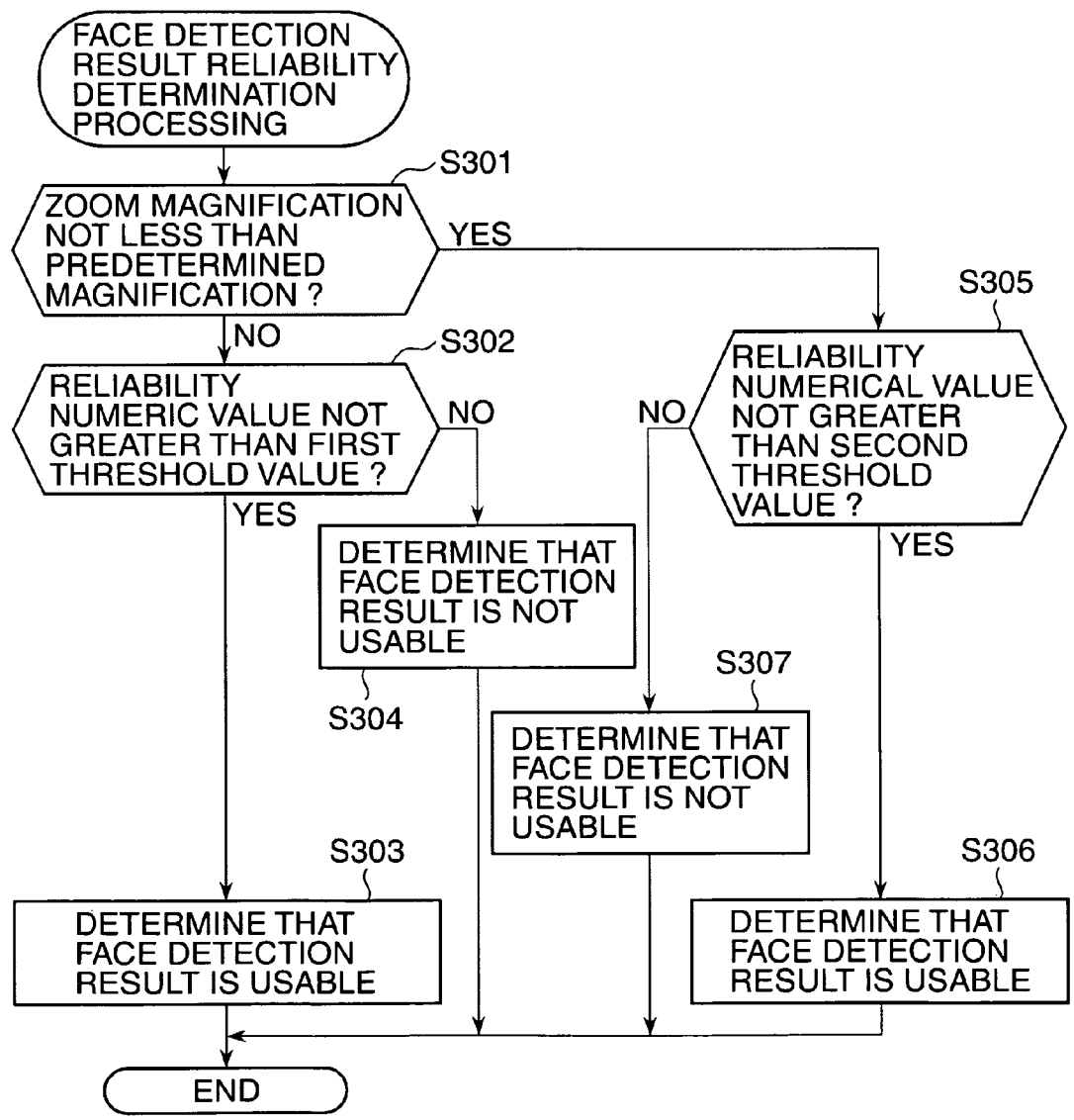
FIG. 3 is a flowchart showing the procedures of face-detection-result reliability determination processing executed in step S204 in FIG. 2 to determine whether a face detection result can be usable for AF control and frame display control.

FIG. 3 shows in flowchart the procedures of the face-detection-result reliability determination processing in step S204 in FIG. 2 to determine whether the face detection result can be usable for the AF control and frame display control. This processing is to determine the likelihood of a face being present in the detected face area. To this end, a determination condition is varied. In particular, a threshold value as a determination criterion based on which a determination is made as to whether the face detection result is usable for AF control and frame display is varied to correspond to the zoom magnification.

As shown in FIG. 3, the computer 114 determines whether the zoom magnification of the video camera 100 is equal to or greater than a predetermined magnification (step S301).

If it is determined that the zoom magnification is less than the predetermined magnification, i.e., if the zoom magnification is on a so-called wide side (NO to step S301), the computer 114 (reliability determination unit) determines whether a numeric value representing reliability of the face detection result by the face detection processing circuit 116 is equal to less than a first threshold value (step S302).

The reliability is a measure of the likelihood of a main object face being present in an area, which is recognized as the face area based on the face detection result. FIG. 4 is a table showing an example correspondence between numeric value representing reliability and criterion in accordance with which the reliability numeric value is set. As shown in FIG. 4, a smaller reliability numeric value represents a higher reliability of face detection result, i.e., a higher likelihood of the main object face being present in the area recognized as the face area.

Referring to FIG. 3 again, if the numeric value representing reliability of face detection result is equal to less than the first threshold value (YES to step S302), it is determined that the face detection result is usable (step S303). On the other hand, if the reliability numeric value is greater than the first threshold value (NO to step S302), it is determined that the face detection result is not usable (step S304).

If it is determined that the zoom magnification is equal to or greater than the predetermined magnification, i.e., if the zoom magnification is on a so-called tele side (YES to step S301), the computer 114 determines whether the numeric value representing reliability of face detection result is equal to or less than a second threshold value (step S305), which is set to be larger than the first threshold value.

If the numeric value representing reliability of face detection result is equal to less than the second threshold value (YES to step S305), the face detection result is determined to be usable (step S306). If the reliability numeric value is greater than the second threshold value (NO to step S305), the face detection result is determined not to be usable (step S307).

When it has been decided by the computer 114 that the face detection result is usable or not usable, the reliability determination processing is completed.

With the focusing process in FIG. 2, the AF frame is set to either the face frame or the normal frame in accordance with the result of the zoom-magnification-based reliability determination processing in FIG. 3. Therefore, the AF control can be made according to the zoom magnification.

In the following, a relation between zoom magnification and threshold value is described with reference to FIG. 5.

FIG. 5 is a table showing an example relation between zoom magnification and threshold value for a case where the predetermined magnification in step S301 is 10 times.

When the table shown in FIG. 5 is applied to the reliability determination processing in FIG. 3, the first threshold value having a numeric value from 1 to 3 is used as the threshold value, if the zoom magnification is less than 10 times, whereas the second threshold value having a numeric value from 1 to 6 is used as the threshold value, if the zoom magnification is equal to or greater than 10 times. The second threshold value is set to a numeric value greater than that of the first threshold value. For example, when the first threshold value is set at a numeric value of 2, the second threshold value is set to a numeric value from 3 to 6 greater than 2. With this setting, the reliability determination criterion is set such that the criterion becomes easier to be satisfied at high zoom magnification (equal to or greater than 10 times) than at low zoom magnification (less than 10 times) since the reliability of face detection result becomes lower with the increasing reliability numeric value as shown in FIG. 4.

In general, with the increasing zoom magnification, the influence of photographer's hand-shake on picked-up image tends to become greater and the resolution of picked-up image tends to be lowered. Therefore, in the case of an image pickup apparatus using the threshold value set at a reliability numeric value optimum for low zoom magnification, the reliability demanded at high magnification photographing becomes excessively high. In that case, face detection probability decreases at high magnification photographing, making it impossible to achieve stable focusing on the main object.

On the other hand, in the case of an image pickup apparatus using the threshold value set at a reliability numeric value optimum for high zoom magnification, the face detection is made even on an object other than the main object at low magnification photographing where high-resolution image can be acquired, making it impossible to achieve stable focusing on the main object. If the frame display control is effected along with the AF control, the frame display excessively appears on the display screen, making it difficult for the photographer to view the display screen and determine the in-focused position.

On the contrary, according to the first embodiment, the condition to determine whether the face detection result is usable for the AF control is varied according to zoom magnification. Specifically, the determination criterion value is set at the first threshold value if the zoom magnification is lower than the predetermined magnification, and set at the second threshold value representing a lower reliability of face detection result than that represented by the first threshold value, if the zoom magnification is equal to larger than the predetermined magnification. With this setting, in order for the face detection result to be determined as being usable, the face detection result is required to have a higher reliability at low zoom magnification than at high zoom magnification. In other words, the determination criterion (predetermined condition) is varied so as to be more easily satisfied at higher zoom magnification (longer focal distance). It is therefore possible to set the optimum threshold value (determination criterion value) that varies according to the zoom magnification.

With the first embodiment, it is therefore possible to make highly accurate face detection at high photographing resolution and make stable face detection even at low photographing resolution, whereby stable focusing on the object can be achieved. In addition, by the frame display control performed along with accurate AF control, it is possible to eliminate the drawbacks that the frame display excessively appears on the display screen and the photographer is difficult to recognize the in-focused position on the screen.

This embodiment is not limited to the above. For example, the reliability of face detection result can be determined by using focal distance as the imaging state information, instead of using the zoom magnification.

(Second Embodiment)

Next, an image pickup apparatus according to a second embodiment is described.

The overall construction of the image pickup apparatus of this embodiment is the same as or similar to the video camera 100 of the first embodiment, and a description thereof will be omitted.

Figure 6:
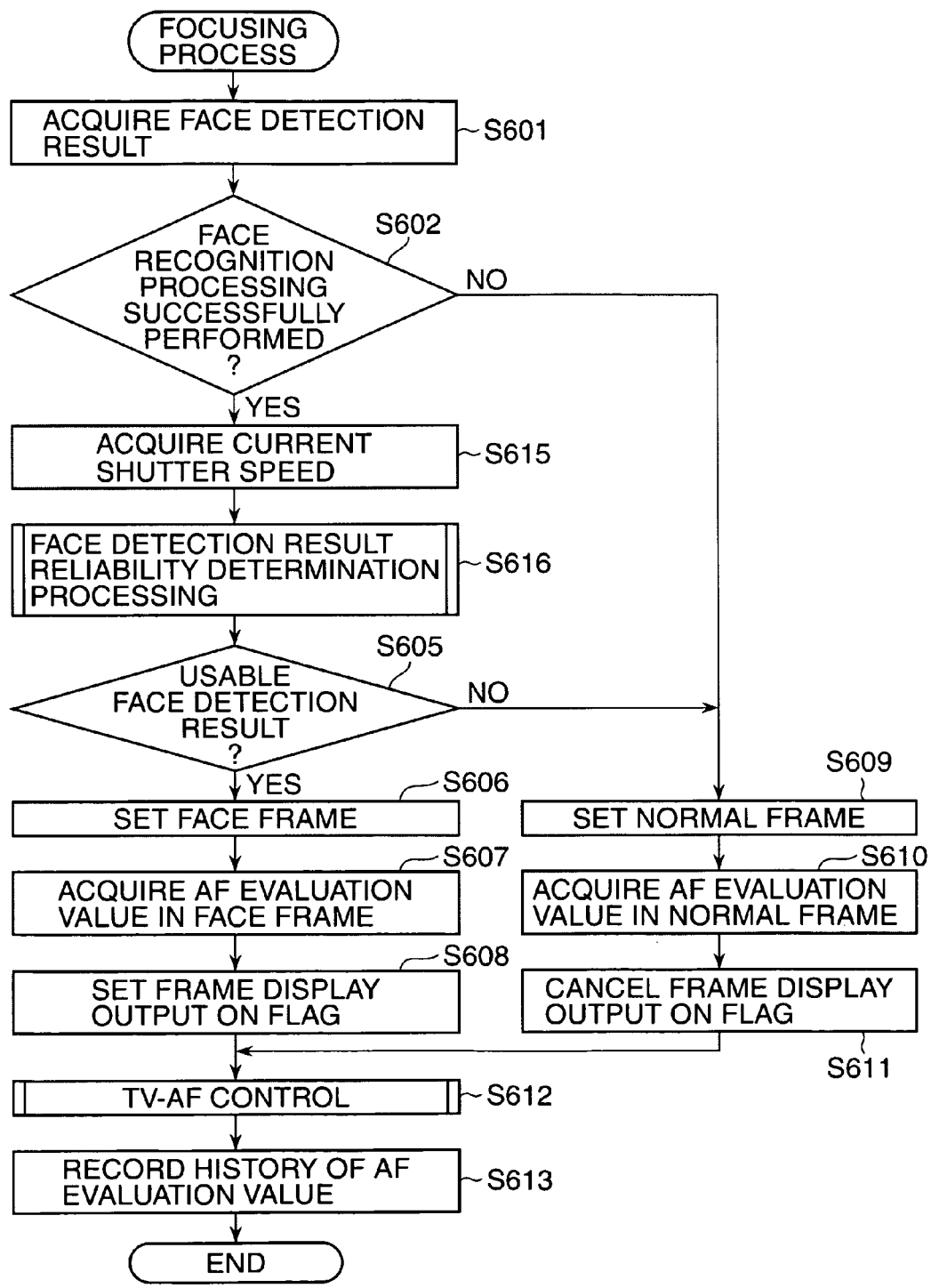
FIG. 6 is a flowchart showing the procedures of a focusing process performed by an image pickup apparatus according to a second embodiment.

FIG. 6 shows in flowchart the procedures of a focusing process executed by the image pickup apparatus of the second embodiment, in which AF control and frame display control are carried out according to shutter speed. The focusing process is basically the same as that of the first embodiment (FIG. 2). In FIG. 6, operations common to those shown in FIG. 2 are each denoted by a step number having the same last two digits as that for the corresponding operation in FIG. 2, with a description thereof omitted. In the following, only different operations are described.

As shown in FIG. 6, if it is determined in step S602 that face recognition processing has been successfully performed, the computer 114 acquires a current shutter speed (step S615). Based on the acquired shutter speed, the computer 114 performs face-detection-result reliability determination processing to determine whether the face detection result can be usable for the AF control and frame display control (step S616). Then, whether or not the face detection result is usable is determined based on a result of the reliability determination processing (step S605). As with the first embodiment, the computer 114 executes subsequent steps S606 to S613 in accordance with a result of determination in step S605, and then completes the focusing process.

Figure 7:
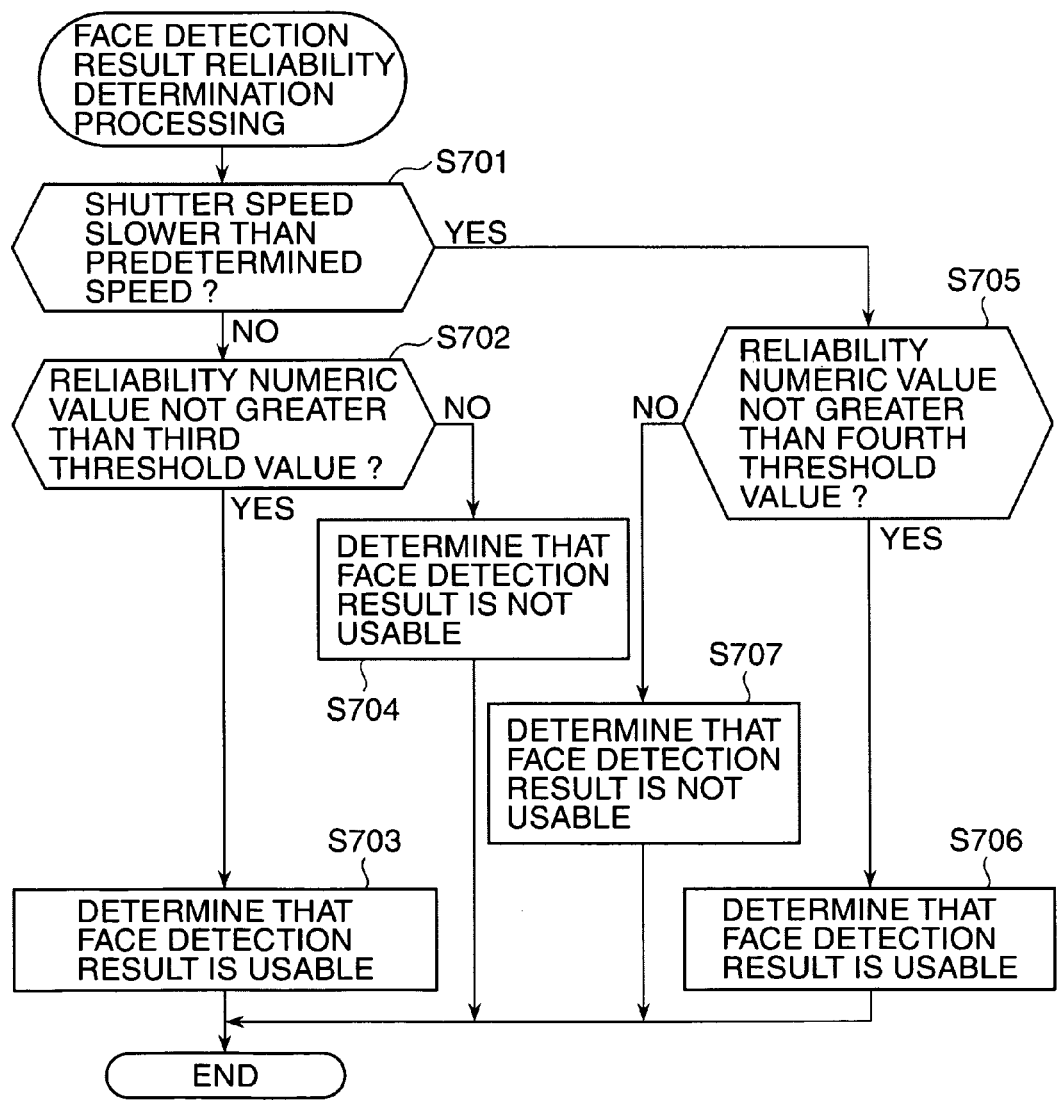
FIG. 7 is a flowchart showing the procedures of face-detection-result determination processing performed in step S616 in FIG. 6.

FIG. 7 shows in flowchart the procedures of the face-detection-result reliability determination processing in step S616 in FIG. 6, in which the condition for reliability determination is varied according to shutter speed.

Referring to FIG. 7, the computer 114 first determines whether the shutter speed of the image pickup apparatus is slower than a predetermined speed (step S701).

If the shutter speed is equal to or greater than the predetermined speed (NO to step S701), the computer 114 determines whether a numeric value representing reliability of face detection result is equal to or less than a third threshold value (step S702). It should be noted that e.g., the table shown in FIG. 4 can be used to set the reliability numeric value, as with the first embodiment.

If the numeric value representing reliability of face detection result is equal to or less than the third threshold value (YES to step S702), the face detection result is determined to be usable (step S703). On the other hand, if the reliability numeric value is larger than the third threshold value (NO to step S702), the face detection result is determined not to be usable (step S704).

If the shutter speed is slower than the predetermined speed (YES to step S701), the computer 114 determines whether the numeric value representing reliability of face detection result is equal to or less than a fourth threshold value, which is set to be larger than the third threshold value (step S705).

If the numeric value representing reliability of face detection result is equal to or less than the fourth threshold value (YES to step S705), the face detection result is determined to be usable (step S706). If the reliability numeric value is greater than the fourth threshold value (NO to step S705), the face detection result is determined not to be usable (step S707).

When it has been decided by the computer 114 that the face detection result is usable or not usable, the reliability determination process is completed.

With the focusing process in FIG. 6, the AF frame is set to either the face frame or the normal frame in accordance with the result of the shutter-speed-based reliability determination processing in FIG. 7. Therefore, the AF control can be made according to the shutter speed.

In the following, a relation between shutter speed and threshold value is described with reference to FIG. 8.

FIG. 8 is a table showing an example relation between shutter speed and threshold value for a case where the predetermined speed in step S701 is 1/15 s.

When the table in FIG. 8 is applied to the reliability determination processing in FIG. 7, the third threshold value having a numeric value from 1 to 3 is used as the threshold value if the shutter speed is equal to or faster than 1/15 s, whereas the fourth threshold value having a numeric value from 1 to 6 is used as the threshold value if the shutter speed is slower than 1/15 s. The fourth threshold value is set to a numeric value greater than that of the third threshold value. For example, when the third threshold value is set at a numeric value of 2, the fourth threshold value is set to a numeric value from 3 to 6 greater than 2. With this setting, the reliability determination criterion is set such that the criterion becomes more easier at slow shutter speed (less than 1/15 s) than at fast shutter speed (equal to or larger than 1/15 s) since the reliability of face detection result becomes lower with the increasing reliability numeric value (see FIG. 4).

In general, with the lowering shutter speed, the influence of photographers hand-shake on picked-up image tends to become greater and the resolution of the picked-up image tends to be lowered. Therefore, in the case of an image pickup apparatus using the threshold value set at a reliability numeric value optimum for fast shutter speed, the reliability demanded at slow shutter-speed photographing becomes excessively high. In that case, face detection probability decreases at slow shutter-speed photographing, making it impossible to achieve stable focusing on the main object.

On the other hand, in the case of an image pickup apparatus using the threshold value set at a reliability numeric value optimum for slow shutter speed, the face detection is made even on an object other than the main object at fast shutter-speed photographing, making it impossible to achieve stable focusing on the main object. If the frame display control is effected along with the AF control, the frame display excessively appears on the display screen, making it difficult for the photographer to view the display screen and determine the in-focused position.

On the contrary, according to the second embodiment, a condition to determine whether the face detection result is usable for the AF control is varied according to shutter speed. Specifically, the determination criterion value is set at the third threshold value if the shutter speed is equal to or higher than a predetermined speed, and is set at the fourth threshold value representing a lower reliability than that represented by the third threshold value, if the shutter speed is slower than the predetermined speed. With this setting, in order for the face detection result to be determined as being usable, the face detection result is required to have a higher reliability at fast shutter speed than at slow shutter speed. In other words, the determination criterion (predetermined condition) is varied so as to be more easily satisfied at slower shutter speed. It is therefore possible to set the optimum threshold value (determination criterion value) that varies according to the shutter speed.

With the second embodiment, it is therefore possible to make highly accurate face detection at high photographing resolution and make stable face detection even at low photographing resolution, whereby stable focusing on the object can be achieved. In addition, by the frame display control performed along with accurate AF control, it is possible to eliminate the drawbacks that the frame display excessively appears on the display screen and the photographer is difficult to recognize the in-focused position on the screen.

(Third and Fourth Embodiments)

Next, third and fourth embodiments are described.

The overall construction of image pickup apparatuses of the third and fourth embodiments is the same as or similar to the video camera 100 of the first embodiment, and a description thereof will be omitted. A focusing process performed by the image pickup apparatuses of these embodiments is basically the same as that of the first embodiment, and a drawing figure corresponding to FIG. 2 is omitted.

The following is a description of the third embodiment.

In the focusing process performed by the image pickup apparatus of this embodiment, a current in-focus degree is acquired instead of a current zoom magnification acquired in step S203 in FIG. 2, and the focusing process is carried out based the acquired in-focus degree.

The in-focus degree may be one that simply indicates an out-of-focus state when a high-frequency component of a brightness signal of a picked-up image, which represents a focus state of the image-pickup optical system, cannot be acquired despite that there is a contrast between object and background. For example, the in-focus degree can be represented by a value obtained by classifying, into ten stages (from 1 to 10), the quotient of division where a maximum value of high-frequency component outputs for respective lines of the picked-up image is divided by a maximum value of differences each between maximum and minimum values of brightness signal for the corresponding line. In this embodiment, it is determined that the larger the value of in-focus degree, the more satisfactorily the in-focus state is achieved. In this embodiment, the computer 114 functions as an object in-focus degree detection unit that detects the in-focus degree.

Figure 9:
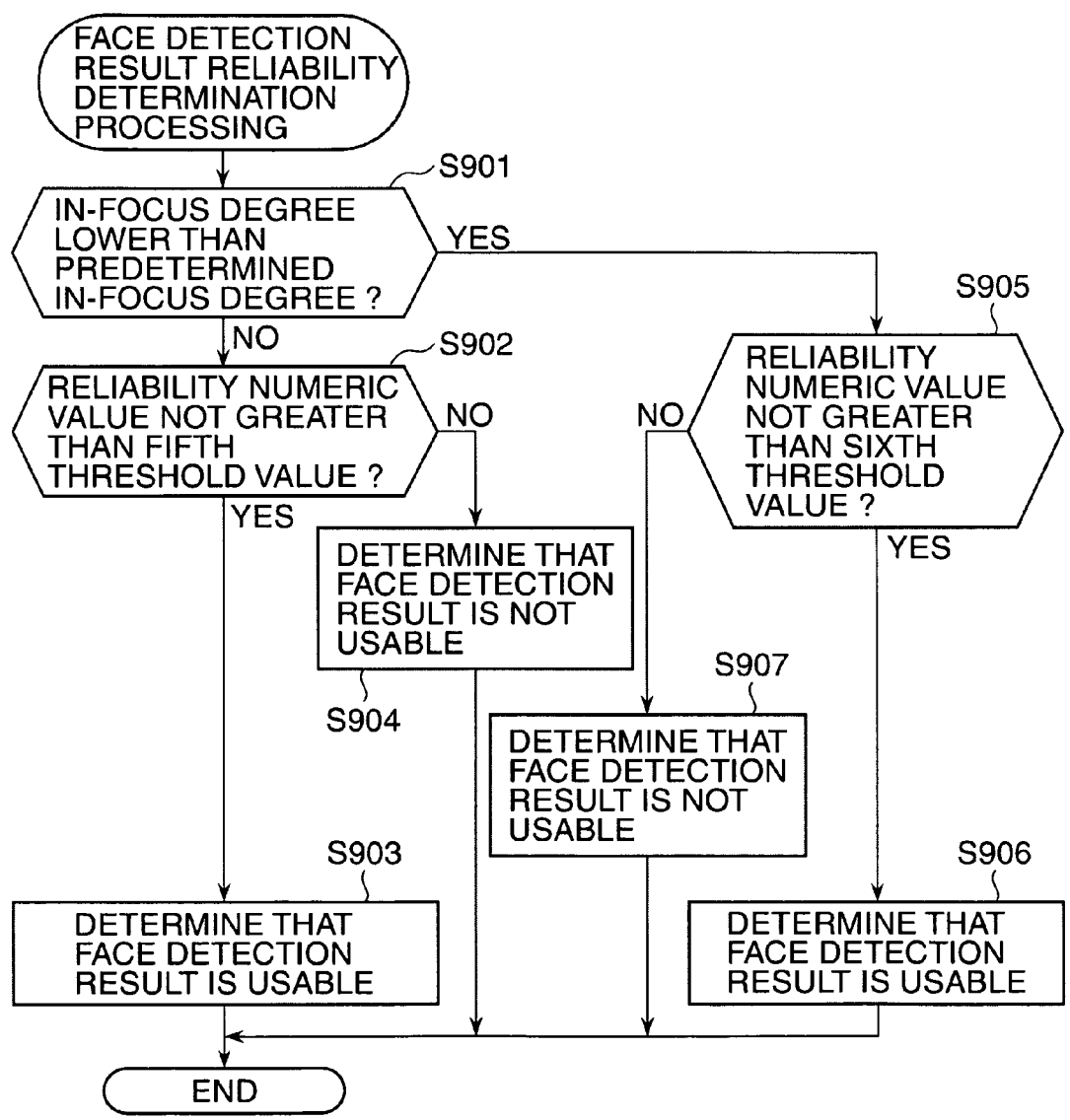
FIG. 9 is a flowchart showing the procedures of face-detection-result reliability determination processing performed by an image pickup apparatus according to a third embodiment.

FIG. 9 shows in flowchart the procedures of face-detection-result reliability determination processing executed by the image pickup apparatus of the third embodiment, in which the condition for reliability determination (threshold value) is varied according to the in-focus degree. This processing is basically the same as that of the first embodiment (FIG. 3). In FIG. 9, operations common to those shown in FIG. 3 are each denoted by a step number having the same last two digits as that for the corresponding operation in FIG. 3, with a description thereof omitted. In the following, only different operations are described.

Referring to FIG. 9, the computer 114 determines whether the in-focus degree is lower than a predetermined in-focus degree (step S901).

If the in-focus degree is equal to or higher than the predetermined in-focus degree (NO to step S901), the computer 114 determines whether a numeric value representing reliability of face detection result is equal to or less than a fifth threshold value (step S902). It should be noted that e.g., the table shown in FIG. 4 can be used to set the reliability numeric value, as with the first embodiment.

If, on the other hand, the in-focus degree is lower than the predetermined in-focus degree (YES to step S901), the computer 114 determines whether the numeric value representing reliability of face detection result is equal to or less than a sixth threshold value, which is set to a numeric value greater than that of the fifth threshold value (step S905). When the reliability of the face detection result has been determined by the computer 114, the reliability determination processing is completed.

With the focusing process including the reliability determination processing in FIG. 9, the AF frame is set to either the face frame or the normal frame in accordance with the result of the in-focus degree-based reliability determination processing. Therefore, the AF control can be made according to the in-focus degree.

In the following, a relation between in-focus degree and threshold value is described with reference to FIG. 10.

FIG. 10 is a table showing an example relation between in-focus degree and threshold value for a case where the predetermined in-focus degree in step S901 is 6.

When the table in FIG. 10 is applied to the reliability determination processing in FIG. 9, the fifth threshold value having a numeric value from 1 to 3 is used as the threshold value if the in-focus degree is equal to or greater than 6, whereas the sixth threshold value having a numeric value from 1 to 6 is used as the threshold value if the in-focus degree is less than 6. The sixth threshold value is set to a numeric value greater than that of the fifth threshold value. For example, when the fifth threshold value is set at a numeric value of 2, the sixth threshold value is set to a numeric value from 3 to 6 greater than 2. With this setting, the reliability determination criterion is set such that the criterion becomes easier to be satisfied at low in-focus degree (less than 6) than at high in-focus degree (equal to or larger than 6) since the reliability of face detection result becomes lower with the increasing reliability numeric value (see FIG. 4).

The following is a description of the fourth embodiment.

In the focusing process performed by the image pickup apparatus of this embodiment, illuminance representing current brightness of the object is acquired instead of a current zoom magnification acquired in step S203 in FIG. 2, and the focusing process is carried out based the acquired illuminance. In this embodiment, the computer 114 functions as an object brightness detection unit that detects illuminance of the object.

Figure 11:
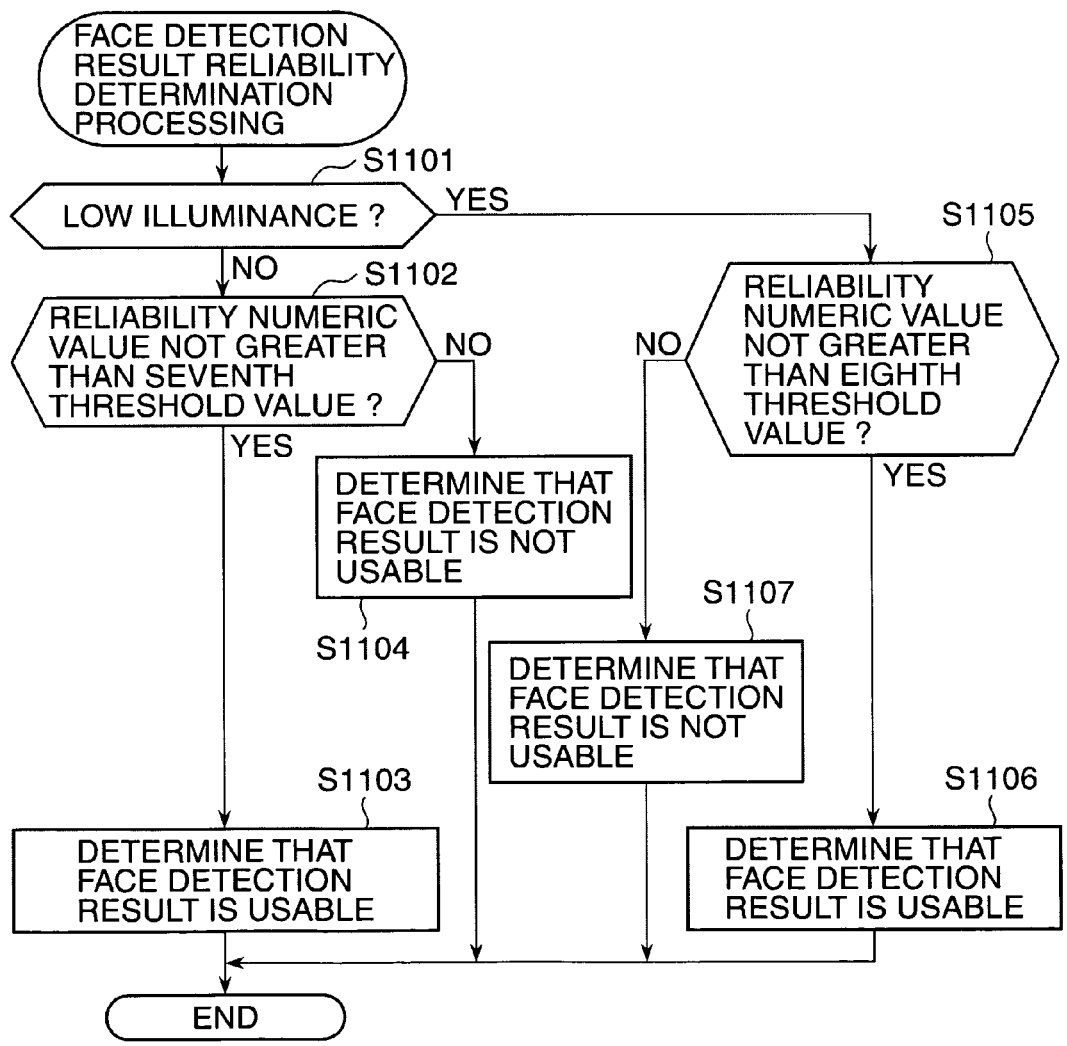
FIG. 11 is a flowchart showing the procedures of face-detection-result reliability determination processing performed by an image pickup apparatus according to a fourth embodiment.

FIG. 11 shows in flowchart the procedures of face-detection-result reliability determination processing executed by the image pickup apparatus of the fourth embodiment, in which the condition for reliability determination condition (threshold value) is varied according to illuminance. This processing is basically the same as that of the first embodiment (FIG. 3). In FIG. 11, operations common to those shown in FIG. 3 are each denoted by a step number having the same last two digits as that for the corresponding operation in FIG. 3, with a description thereof omitted. In the following, only different operations are described.

Referring to FIG. 11, the computer 114 determines whether illuminance is low (step S1101).

If the illuminance is not low (NO to step S1101), the computer 114 determines whether the numeric value representing reliability of face detection result is equal to or less than a seventh threshold value (step S1102). It should be noted that e.g., the table shown in FIG. 4 can be used to set the reliability numeric value, as with the first embodiment.

If, on the other hand, the illuminance is low (YES to step S1101), the computer 114 determines whether the numeric value representing reliability of face detection result is equal to or less than an eighth threshold value, which is set to a numeric value greater than that of the seventh threshold value (step S1105). When the reliability of the face detection result has been determined by the computer 114, the reliability determination processing is completed.

With the focusing process including the reliability determination processing in FIG. 11, the AF frame is set to either the face frame or the normal frame in accordance with the result of the illumination-based reliability determination processing. Therefore, the AF control can be carried out according to the illumination.

With reference to FIG. 12, a relation between brightness and threshold value is described.

FIG. 12 shows in table an example relation between brightness and threshold value.

When the table in FIG. 12 is applied to the reliability determination processing in FIG. 11, the seventh threshold value having a numeric value from 1 to 3 is used as the threshold value if the illumination is not low, whereas the eighth threshold value having a numeric value from 1 to 6 is used as the threshold value if the illuminance is low. The eighth threshold value is set to a numeric value greater than that of the seventh threshold value. For example, when the seventh threshold value is set at a numeric value of 2, the eighth threshold value is set to a numeric value from 3 to 6 greater than 2. With this setting, the reliability determination criterion is set such that the criterion becomes easier to be satisfied at low illuminance than at high illuminance since the reliability of face detection result becomes lower with the increasing reliability numeric value (see FIG. 4).

In general, with the lowering in-focus degree or with the lowering illuminance, the resolution of the picked-up image tends to be lowered. Therefore, in the case of an image pickup apparatus using the threshold value set at a reliability numeric value optimum for high in-focus degree or not low luminance and an image pickup apparatus using the threshold value set at a reliability numeric value optimum for low in-focus degree or low luminance, stable focusing on the main object cannot be achieved. If the frame display control is effected along with the AF control, the frame display excessively appears on the display screen, making it difficult for the photographer to view the display screen and determine the in-focused position.

On the contrary, according to the third and fourth embodiments, a condition to determine whether the face detection result is usable for the AF control and frame display is varied according to in-focus degree and illuminance, respectively. Specifically, the determination criterion value is set at the fifth threshold value if the in-focus degree is equal to or higher than a predetermined in-focus degree, and is set at the sixth threshold value representing a lower reliability than that represented by the fifth threshold value, if the in-focus degree is lower than the predetermined in-focus degree. The determination criterion value is set at the seventh threshold value if the illuminance is not low, and is set at the eighth threshold value representing a lower reliability than that represented by the seventh threshold value, if the illuminance is low.

With the above settings, in order for the face detection result by the face detection processing circuit 116 to be determined as being usable, the face detection result is required to have a higher reliability at high in-focus degree or at not low illuminance than at low in-focus degree or at low illuminance. In other words, the determination criterion (predetermined condition) is varied so as to be more easily satisfied at lower in-focus degree or at lower illuminance (object brightness) It is therefore possible to set the optimum threshold value (determination criterion value) that varies according to the in-focus degree or illuminance.

With the third and fourth embodiments, it is therefore possible to make highly accurate face detection at high photographing resolution and make stable face detection even at low photographing resolution, whereby stable focusing on the object can be achieved. In addition, by the frame display control performed along with accurate AF control, it is possible to eliminate the drawbacks that the frame display excessively appears on the display screen and the photographer is difficult to recognize the in-focused position on the screen.

(Fifth and Sixth Embodiments)

Next, image pickup apparatuses according to fifth and sixth embodiments are described.

The overall construction of image pickup apparatuses of these embodiments is the same as or similar to that of the video camera 100 of the first embodiment, and a description thereof will be omitted. Focusing processes performed by the image pickup apparatuses of these embodiments are basically the same as those of the first and second embodiments, respectively, and drawing figures corresponding to FIGS. 2 and 6 are omitted.

The following is a description of the fifth embodiment.

Figure 13:
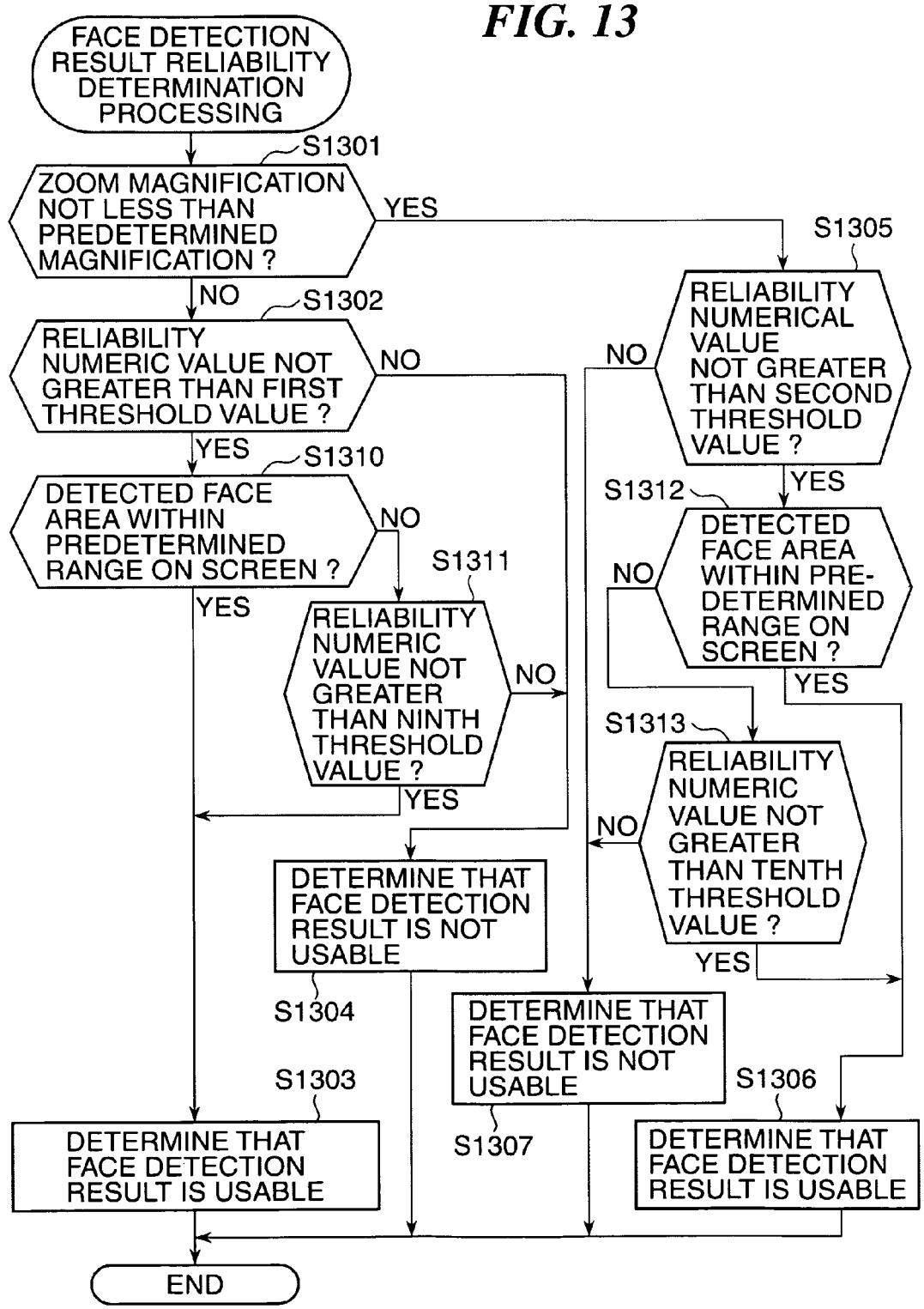
FIG. 13 is a flowchart showing the procedures of face-detection-result reliability determination processing performed by an image pickup apparatus according to a fifth embodiment.

FIG. 13 shows in flowchart the procedures of face-detection-result reliability determination processing performed by the image pickup apparatus of the fifth embodiment, in which the condition for reliability determination (threshold value) is varied according to zoom magnification and face area position on the imaging screen. In the processing shown in FIG. 13, operations common to those shown in FIG. 3 are each denoted by a step number having the same last two digits as that for the corresponding operation in FIG. 3, with a description thereof omitted. In the following, only different operations are described.

Referring to FIG. 13, if the zoom magnification is lower than a predetermined magnification (NO to step S1301) and the numeric value representing reliability of face detection result is equal to or less than a first threshold value (YES to step S1302), the computer 114 determines whether the detected face area is within a predetermined range on the imaging screen (step S1310). It should be noted that e.g., the table shown in FIG. 4 can be used to set the reliability numeric value, as with the first embodiment.

Figures 14, 15:
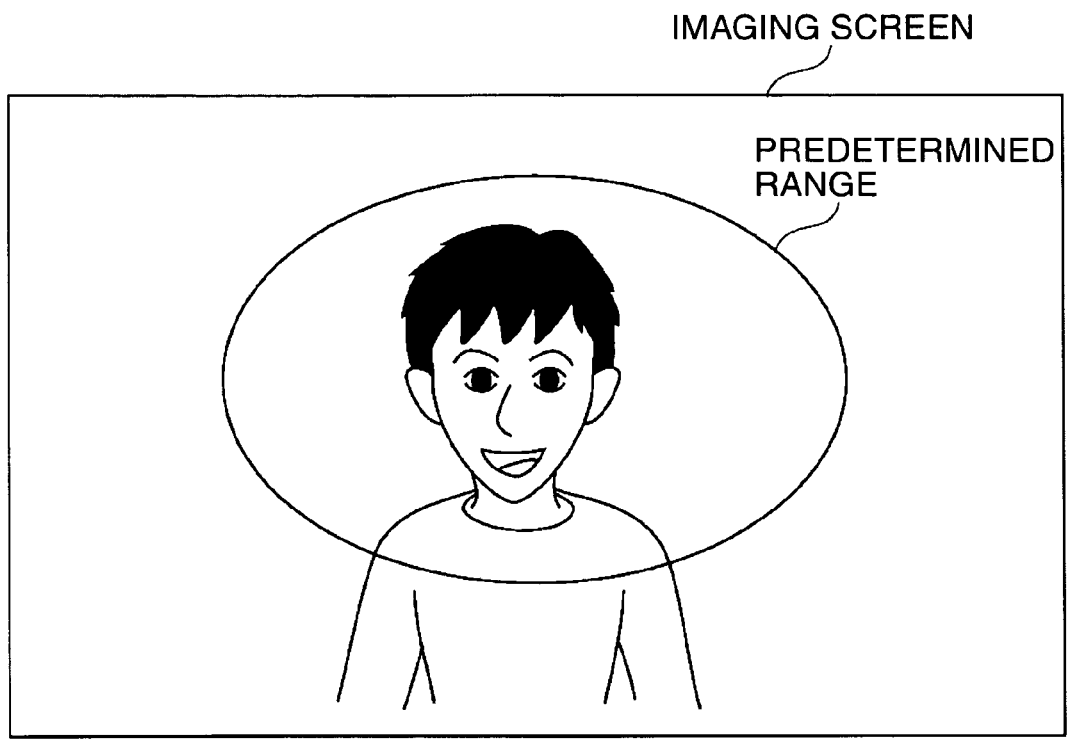
FIG. 14 is a view showing an example of a predetermined range on an imaging screen.
FIG. 15 is a table showing an example relation between zoom magnification and threshold value for a case where an object area is away from the center of the imaging screen.

A central part of the imaging screen surrounded elliptically by a solid line in FIG. 14 is set as the predetermined range on the imaging screen for the reason that in most cases, the photographer takes a picture with the main object (person) in the center of the display screen (imaging screen).

Referring to FIG. 13 again, if the detected face area is within the predetermined range on the imaging screen (YES to step S1310), the face detection result is determined to be usable (step S1303).

If the detected face area is not within the predetermined range on the imaging screen (NO to step S1310), the computer 114 determines whether the numeric value representing reliability of face detection result is equal to or less than a ninth threshold value, which is set to a numeric value less than that of the first threshold value (step S1311). If the reliability numeric value is equal to or less than the ninth threshold value (YES to step S1311), the face detection result is determined to be usable (step S1303). On the other hand, if the reliability numeric value is greater than the ninth threshold value (NO to step S1311), the face detection result is determined not to be usable (step S1304).

If the zoom magnification is equal to or greater than the predetermined magnification (YES to step S1301) and the numeric value representing reliability of face detection result is equal to or less than a second threshold value (YES to step S1305), whether the detected face area is within the predetermined range on the imaging screen is determined (step S1312).

If the detected face area is within the predetermined range on the imaging screen (YES to step S1312), the face detection result is determined to be usable for the AF control and frame display (step S1306).

On the other hand, if the detected face area is not within the predetermined range (NO to step S1312), the computer 114 determines whether the numeric value representing reliability of face detection result is equal to or less than a tenth threshold value, which is set to a numeric value less than that of the second threshold value (step S1313). If the reliability numeric value is equal to or less than the tenth threshold value (YES to step S1313), the face detection result is determined to be usable (step S1306). If the reliability numeric value is greater than the tenth threshold value (NO to step S1313), the face detection result is determined not to be usable (step S1307).

With the focusing process including the reliability determination processing in FIG. 13, the AF frame is determined in accordance with the result of the reliability determination based on zoom magnification and detected face position information. Therefore, the AF control can be carried out according to the zoom magnification and face position information.

In the following, with reference to FIG. 15, a relation between zoom magnification and threshold value is described for a case where the object area is away from the center of the imaging screen.

FIG. 15 shows in table an example relation between zoon magnification and threshold value for a case where the object area is away from the center of the imaging screen and the predetermined magnification in step S1301 is 10 times.

When the table in FIG. 15 is applied to the reliability determination processing in FIG. 13, the ninth threshold value having a numeric value 1 or 2 is used as the threshold value, if the zoom magnification is less than 10 times and the detected face is not within the predetermined range on the imaging screen. On the other hand, the tenth threshold value having a numeric value from 1 to 5 is used as the threshold value, if the zoom magnification is equal to or greater than 10 times and the detected face area is not within the predetermined range on the imaging screen.

The ninth threshold value is set to a numeric value less than that of the first threshold value (see FIG. 5). For example, when the first threshold value is set at a numeric value of 3, the ninth threshold value is set to a numeric value of 2 less than 3. Similarly, the tenth threshold value is set to a numeric value less than that of the second threshold value (see FIG. 5). For example, when the second threshold value is set to 6, the tenth threshold value is set to 5 which is less than 6. With these settings, the reliability determination criterion is set such that the criterion becomes more strict when the detected face are is not within the predetermined range on the imaging screen than when the detected face area is within the predetermined range.

The following is a description of the sixth embodiment.

Figure 16:
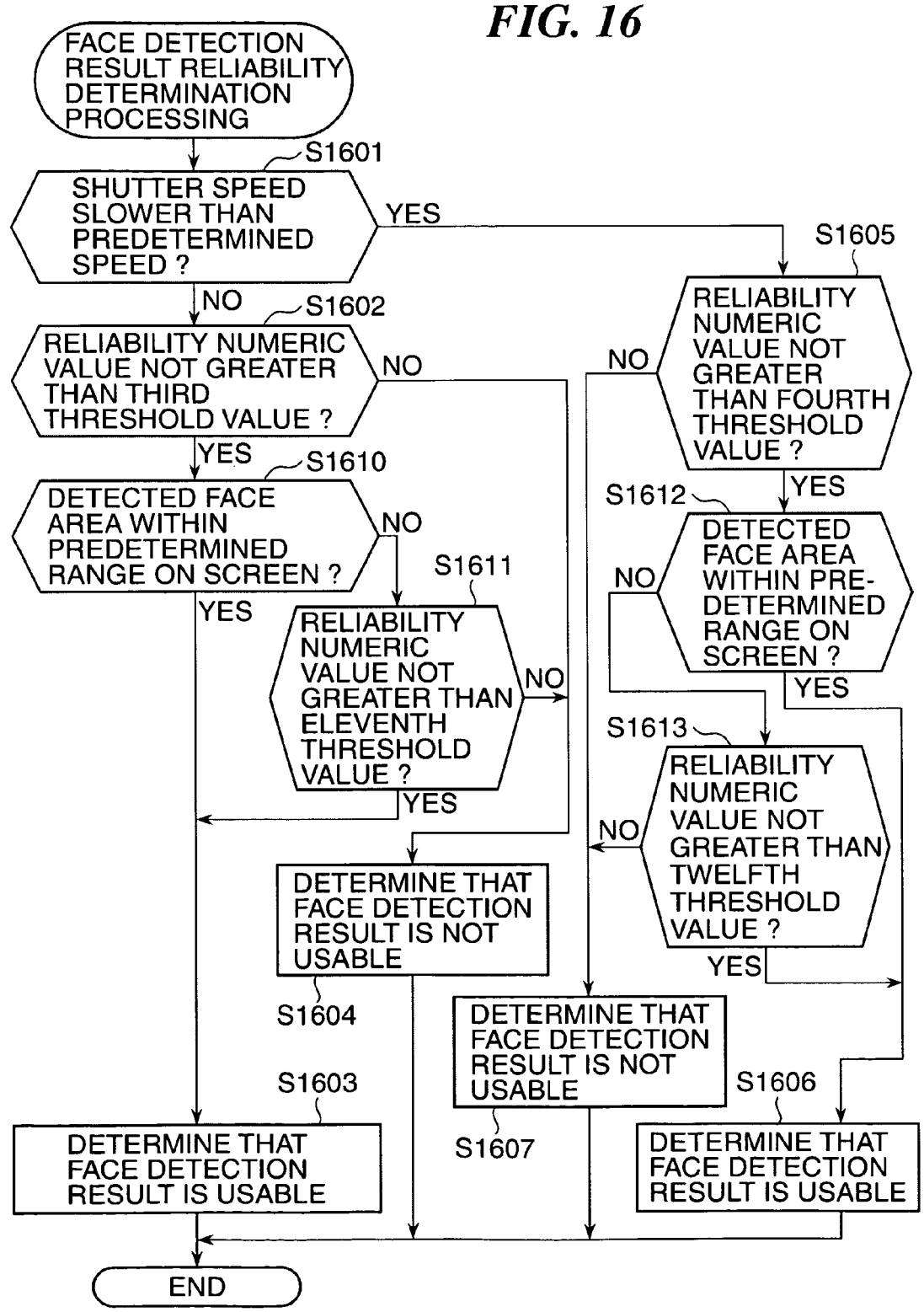
FIG. 16 is a flowchart showing the procedures of face-detection-result reliability determination processing performed by an image pickup apparatus according to a sixth embodiment.

FIG. 16 shows in flowchart the procedures of face-detection-result reliability determination processing performed by the image pickup apparatus of the sixth embodiment, in which the condition for reliability determination (threshold value) is varied according to shutter speed and face area position on the imaging screen. In the processing shown in FIG. 16, operations common to those shown in FIG. 7 are each denoted by a step number having the same last two digits as that for the corresponding operation in FIG. 7, with a description thereof omitted. In the following, only different operations are described.

Referring to FIG. 16, if a shutter speed is equal to or greater than a predetermined speed (NO to step S1601) and if a numeric value representing reliability of face detection result is equal to or less than a third threshold value (YES to step S1602), the computer 14 determines whether the detected face area is within a predetermined range on the imaging screen (step S1610). It should be noted that e.g., the table shown in FIG. 4 can be used to set the reliability numeric value, as with the second embodiment. As with the fifth embodiment, e.g., a central part of the imaging screen surrounded elliptically by a solid line in FIG. 14 can be set as the predetermined range.

If the detected face area is within the predetermined range on the imaging screen (YES to step S1610), the face detection result is determined to be usable (step S1603).

If the detected face area is not within the predetermined range on the screen (NO to step S1610), the computer 114 determines whether the numeric value representing reliability of face detection result is equal to or less than an eleventh threshold value, which is set to a numeric value less than that of the third threshold value (step S1611). If the reliability numeric value is equal to or less than the eleventh threshold value (YES to step S1611), the face detection result is determined to be usable (step S1603). If the reliability numeric value is greater than the eleventh threshold value (NO to step S1611), the face detection result is determined not to be usable (step S1604).

If the shutter speed is slower than the predetermined speed (YES to step S1601) and the reliability numeric value is equal to or less than a fourth threshold value (YES to step S1605), the computer 114 determines whether the detected face area is within the predetermined range on the imaging screen (step S1612).

If the detected face area is within the predetermined range (YES to step S1612), the face detection result is determined to be usable (step S1606).

If the detected face area is not within the predetermined range on the imaging screen (NO to step S1612) the computer 114 determines whether the reliability numeric value is equal to or less than a twelfth threshold value, which is set to a numeric value less than that of the fourth threshold value (step S1613). If the reliability numeric value is equal to or less than the twelfth threshold value (YES to step S1613), the face detection result is determined to be usable (step S1606). If the reliability numeric value is greater than the twelfth threshold value (NO to step S1613), the face detection result is determined not to be usable (step S1607).

With the focusing process including the reliability determination processing in FIG. 16, the AF frame is determined in accordance with the result of reliability determination processing based on the shutter speed and detected face position information. Therefore, the AF control can be carried out according to the shutter speed and face position information.

In the following, with reference to FIG. 17, a relation between shutter speed and threshold value is described for a case where the object area is away from the center of the imaging screen.

FIG. 17 is a table showing an example relation between shutter speed and threshold value for a case where the object area is away from the center of the imaging screen and the predetermined speed in step S1601 is $1/15$ s.

When the table in FIG. 17 is applied to the reliability determination processing in FIG. 16, the eleventh threshold value having a numeric value 1 or 2 is used as the threshold value, if the shutter speed is equal to or greater than $1/15$ s and the detected face are is not within the predetermined range on the imaging screen. On the other hand, if the shutter speed is less than $1/15$ s and the detected face area is not within the predetermined range on the imaging screen, the twelfth threshold value having a numeric value from 1 to 5 is used as the threshold value.

The eleventh threshold value is set to a numeric value less than that of the third threshold value (see FIG. 8). For example, when the third threshold value is set at 2, the eleventh threshold value is set to 1 less than 2. The twelfth threshold value is set to a numeric value less than that of the fourth threshold value (see FIG. 8). For example, when the fourth threshold value is set to 5, the twelfth threshold value is set to a numeric value from 1 to 4, which is less than 5. With these settings, the reliability determination criterion is set such that the criterion becomes more strict when the detected face area is not within the predetermined range on the imaging screen than when the detected face area is within the predetermined range.

In most cases, the photographer takes a picture with the main object (person) in the center of the display screen (imaging screen). Accordingly, there is a high possibility that the main object is in or near the center of the screen and the face area detected in or near the screen center corresponds to the main object face, and there is a low possibility that the face detection result is generated by erroneous detection. On the other hand, the probability that the main object is away from the screen center is lower than the probability that the main object is in or near the screen center. The face area detected at a location away from the screen center is less likely to correspond to the main object face, and there is a high possibility that such face detection result is generated by erroneous detection as compared to the face detection result for the main object near the screen center.

According to the fifth and sixth embodiments, a condition to determine whether the face detection result is usable is varied according to zoom magnification and shutter speed, and a second condition to determine whether the face detection result is usable is varied according to whether the detected face are is within the predetermined range on the imaging screen. Specifically, in the fifth embodiment, the ninth or tenth threshold value that represents a higher reliability than that represented by the first or second threshold value is set as a second determination criterion value when the detected face area is not within the predetermined range on the imaging screen. In the sixth embodiment, the eleventh or twelfth threshold value that represents a higher reliability than that represented by the third or fourth threshold value is set as the second determination criterion value when the detected face area is not within the predetermined range on the imaging screen.

With the above settings, in order for the face detection result by the face detection processing circuit 116 to be determined as being usable, the face detection result is required to have a higher reliability when the detected face area is outside the predetermined range than when the detected face area is within the predetermined range on the imaging screen. In other words, the determination criterion (predetermined condition) is varied so as to be more easily satisfied when the object is positioned around the center of the imaging screen than when the object area is positioned away from the screen center. Therefore, it is possible to prevent the AF control and frame display from being performed based on erroneously detected face. With the fifth and sixth embodiments, therefore, further stable focusing on the object can be achieved.

In the fifth and six embodiments, the threshold value is varied according to the zoom magnification or shutter speed and the detected face area position on the imaging screen. This is applicable to the third and fourth embodiments. For example, in the fifth embodiment, parts relating to zoom magnification can be modified to use in-focus degree and illuminance in accordance with teachings of the third and fourth embodiments.

(Seventh Embodiment)

The following is a description of a seventh embodiment.

The overall construction of an image pickup apparatus of this embodiment is the same as or similar to that of the video camera 100 of the first embodiment, and a description thereof will be omitted.

Figure 18:
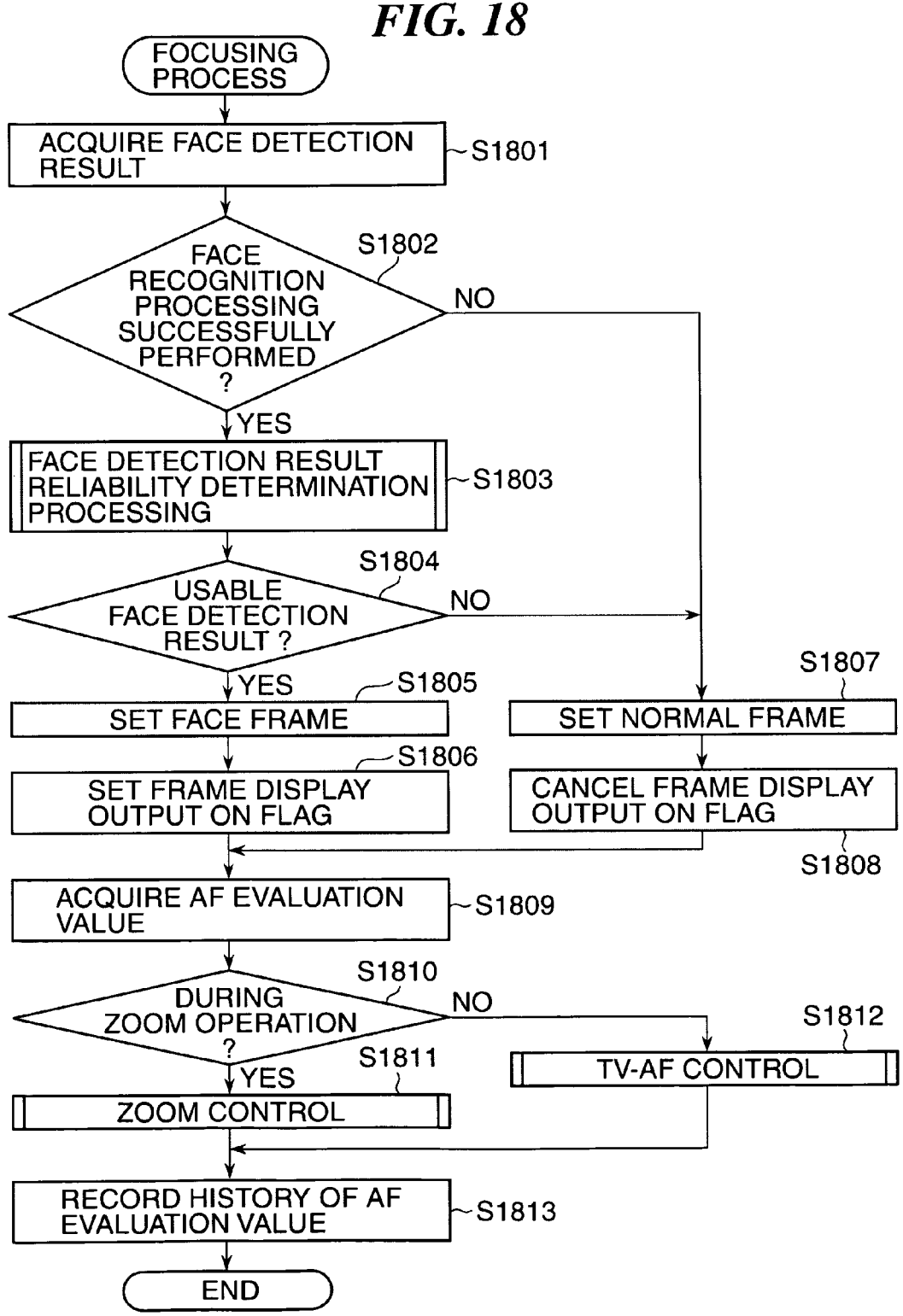
FIG. 18 is a flowchart showing the procedures of a focusing process performed by an image pickup apparatus according to a seventh embodiment.

FIG. 18 shows in flowchart the procedures of a focusing process executed by the image pickup apparatus of the seventh embodiment, in which zoom/AF control and frame display control are carried out according to whether a zooming operation is being executed. As with the other embodiments, the focusing process is executed by a CPU (not shown) in accordance with a computer program stored in the computer 114. The focusing process is repeatedly executed, e.g., at intervals of a readout cycle in which electrical signal is read from the image pickup device 106 for field image formation on a per field basis.

The focusing process in FIG. 18 is started, e.g., upon turn-on of a power source (not shown) of the image pickup apparatus. In accordance with an instruction from the computer 114, the face detection processing circuit 116 performs known face recognition processing on a picked-up image corresponding to the video signal. The computer 114 acquires a face detection result of the face recognition processing (step S1801).

Next, the computer 114 determines whether a face area is present in the acquired face detection result (picked-up image) to determine whether the face recognition processing has been successfully performed (step S1802).

If it is determined that the face recognition processing has been performed successfully (YES to step S1802), the computer 114 performs face-detection-result reliability determination processing to determine whether the face detection result can be used for the AF control and frame display control (step S1803).

If it is determined based on a result of the reliability determination processing in step S1803 that the face detection result is usable (YES to step S1804), the computer 114 sets a face frame to the AF gate 112 (step S1805) and sets an frame display output ON flag (step S1806). When the frame display output ON flag is set, a frame is displayed at a face area position of the main object (main object person) on the display screen of the monitor 109, to enable the photographer to recognize the in-focused position on the picked-up image. The way of setting the frame display is the same as that in other embodiments. After the frame display output ON flag being set, the process proceeds to step S1809.

On the other hand, if it is determined that the face recognition processing has not been successfully performed (NO to step S1802) or that face detection result is not usable (NO to step S1804), the computer 114 sets the normal frame to the AF gate 112 (step S1807). Next, the computer 114 cancels the frame display output ON flag (step S1808), and proceeds to step S1809.

In step S1809, the computer 114 acquires an AF evaluation value in the face frame or the normal frame, and determines whether an image pickup state is during the execution of a zooming operation (step S1810). When determining that the zooming operation is being executed (YES to step S1810), the computer 114 performs known zoom control based on the acquired AF evaluation value (step S1811). When determining that the zooming operation is not being carried out (NO to step S1810), the computer 114 performs the TV-AF control based on the acquired AF evaluation value (step S1812).

After executing the zoom control or the TV-AF control, the computer 114 stores AF evaluation values to record a history of AF evaluation value for the next zoom control or TV-AF control (step S1813) and completes the focusing process.

Figure 19:
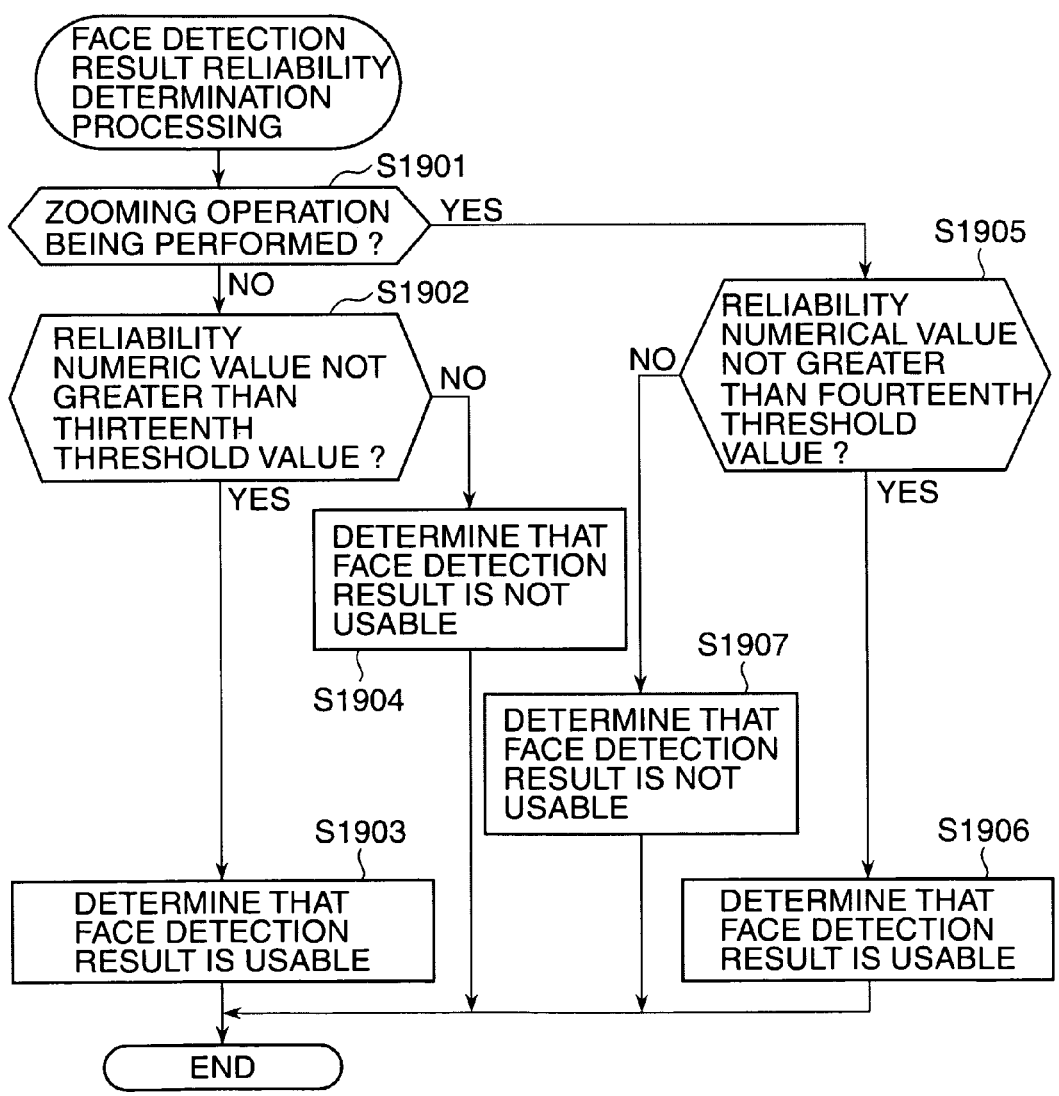
FIG. 19 is a flowchart showing the procedures of face-detection-result reliability determination processing performed in step S1803 in FIG. 18.

FIG. 19 shows in flowchart the procedures of the face-detection-result reliability determination process in step S1803 in FIG. 18, in which a threshold value representing a determination criterion used to determine whether the face detection result is usable for the zoom/AF control and the frame display control is varied in accordance with whether the zooming operation is being performed.

Referring to FIG. 19, the computer 114 determines whether the zooming operation is being performed in the image pickup apparatus (step S1901).

When determining that the zooming operation is not being performed (NO to step S1901), the computer 114 determines whether a numeric value representing reliability of face detection result is equal to or less than a thirteenth threshold value (step S1902). It should be noted that, e.g., the table shown in FIG. 4 can be used to set the reliability numeric value, as with the other embodiments.

If it is determined that the numeric value representing reliability of face detection result is equal to or less than the thirteenth threshold value (YES to step S1902), the face detection result is determined to be usable (step S1903). If it is determined that the reliability numeric value is greater than the thirteenth threshold value (NO to step S1902), the face detection result is determined not to be usable (step S1904).

When determining that the zooming operation is being performed (YES to step S1901), the computer 114 determines whether or not the reliability numeric value is equal to or less than a fourteenth threshold value, which is set to a numeric value greater than that of the thirteenth threshold value (step S1905). If it is determined that the reliability numeric value is equal to or less than the fourteenth threshold value (YES to step S1905), the face detection result is determined to be usable (step S1906). If it is determined that the reliability numeric value is greater than the fourteenth threshold value (NO to step S1905), the face detection result is determined not to be usable (step S1907).

When it has been decided by the computer 114 that the face detection result is usable or not usable, the reliability determination processing is completed.

With the focusing process in FIG. 18, the AF frame is set to either the face frame or the normal frame in accordance with the result of determination by the determination process in FIG. 19 in which the execution/non-execution of zooming operation is taken into account. Therefore, the AF control can be carried out according to the execution/non-execution of the zooming operation.

In the following, a relation between execution/non-execution of zooming operation and threshold value is described with reference to FIG. 20.

FIG. 20 is a table showing an example relation between execution/non-execution of zooming operation and threshold value.

When the table shown in FIG. 20 is applied to the reliability determination processing in FIG. 19, the thirteenth threshold value having a numeric value from 1 to 3 is used as the threshold value if the zooming operation is not being performed, whereas the fourteenth threshold value having a numeric value from 1 to 6 is used as the threshold value if the zooming operation is being performed. The fourteenth threshold value is set to a numeric value greater than that of the thirteenth threshold value. For example, when the thirteenth threshold value is set at 2, the fourteenth threshold value is set to any of values from 3 to 6 greater than 2. With this setting, the reliability determination criterion is set such that the criterion becomes easier to be satisfied when the zooming operation is being performed than when the zooming operation is not being performed since the reliability of face detection result becomes low with the increasing reliability numeric value (see FIG. 4).

During the execution of zooming operation, there is a tendency that a video image is enlarged around the center of the imaging screen and blurred to screen ends. In particular, during a fast zooming operation, the influence of zooming operation on the imaging screen (display screen) becomes noticeable. For example, the influence of hand shake is applied during the execution of zooming operation, the resolution of picked-up image is noticeably lowered. Therefore, in the case of an image pickup apparatus using the threshold value set at a reliability numeric value optimum for when zooming operation is not being performed, the reliability demanded at photographing while zooming operation is being performed becomes excessively high. In that case, face detection probability decreases during the execution of zooming operation, making it impossible to achieve stable focusing on the main object.

On the other hand, in the case of an image pickup apparatus using the threshold value set at a reliability numeric value optimum for when zooming operation is being performed, the face detection is made even on an object other than the main object at photographing while zooming operation is not being performed, making it impossible to achieve stable focusing on the main object. If the frame display control is performed along with the zoom/AF control, the frame display excessively appears on the display screen, making it difficult for the photographer to view the display screen and determine the in-focused position.

On the contrary, according to the seventh embodiment, the condition to determine whether the face detection result is usable for the zoom/AF control and frame display control is varied according to whether or not zooming operation is being performed. Specifically, the determination criterion value is set at the fourteenth threshold value, if zooming operation is being performed. The fourteenth threshold value is set to a numeric value larger than that of the thirteenth threshold value set as the determination criterion value, if zooming operation is not being performed. With this setting, in order for the face detection result by the face detection processing circuit 116 to be determined as being usable, the face detection result is required to have a higher reliability when a zoom operation is not being performed than when a zoom operation is being performed. In other words, the determination criterion (predetermined condition) is varied so as to be more easily satisfied when the zooming operation is being performed. Thus, it is possible to set the optimum threshold value (determination criterion value) that varies according to whether or not the zoom operation is being performed.

With the seventh embodiment, it is therefore possible to make highly accurate face detection at high photographing resolution and make stable face detection even at low photographing resolution, whereby stable focusing on the object can be achieved.

In addition, by the frame display control performed while making accurate AF control, it is possible to eliminate the drawbacks that the frame display excessively appears on the display screen and the photographer is difficult to determine the in-focused position on the screen.

With this invention, it can further be ensured that focusing on the object is made with stability by combining the above described embodiments.

It is to be understood that the present invention may also be accomplished by supplying a system or an apparatus with a storage medium in which a program code of software, which realizes the functions of the above described embodiments is stored and by causing a computer (or CPU or MPU) of the system or apparatus to read out and execute the program code stored in the storage medium.

In that case, the program code itself read from the storage medium realizes the functions of the above described embodiments, and therefore the program code and the storage medium in which the program code is stored constitute the present invention.

Examples of the storage medium for supplying the program code include a floppy (registered trademark) disk, a hard disk, and a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-175619, filed Jul. 4, 2008, which is hereby incorporated by reference herein in its entirety.

What is claimed is:

1. An image pickup apparatus comprising:
an image pickup unit adapted to pick up an image and output a video signal, the image being formed by an image-pickup optical system including a focus lens;

an object detection unit adapted, based on the video signal output from said image pickup unit to detect object information that represents an object area on an imaging screen and likelihood of being an object;

a determination unit adapted to determine whether the likelihood of being an object detected by said object detection unit satisfies a predetermined condition varied according to an imaging state; and a control unit adapted to control a focus adjustment based on a video signal in the object area in a case where it is determined by said determination unit that the likelihood of being an object satisfies the predetermined condition, wherein the imaging state is represented by focal distance, and the predetermined condition is varied so as to be more easily satisfied at a second focal distance than at a first focal distance, the second focal distance being longer than the first focal distance.

2. An image pickup apparatus comprising:

an image pickup unit adapted to pick up an image and output a video signal, the image being formed by an image-pickup optical system including a focus lens;

an object detection unit adapted, based on the video signal output from said image pickup unit, to detect object information that represents an object area on an imaging screen and likelihood of being an object;

a determination unit adapted to determine whether the likelihood of being an object detected by said object detection unit satisfies a predetermined condition varied according to an imaging state; and a control unit adapted to control a focus adjustment based on a video signal in the object area in a case where it is determined by said determination unit that the likelihood of being an object satisfies the predetermined condition, wherein the imaging state is represented by shutter speed, and the predetermined condition is varied so as to be more easily satisfied at a second shutter speed than at a first shutter speed, the second shutter speed being slower than the first shutter speed.

3. An image pickup apparatus comprising:

an image pickup unit adapted to pick up an image and output a video signal, the image being formed by an image-pickup optical system including a focus lens;

an object detection unit adapted, based on the video signal output from said image pickup unit, to detect object information that represents an object area on an imaging screen and likelihood of being an object;

a determination unit adapted to determine whether the likelihood of being an object detected by said object detection unit satisfies a predetermined condition varied according to an imaging state; and a control unit adapted to control a focus adjustment based on a video signal in the object area in a case where it is determined by said determination unit that the likelihood of being an object satisfies the predetermined condition, wherein the imaging state is represented by in-focus degree of the image-pickup optical system to the object, and the predetermined condition is varied so as to be more easily satisfied at a second in-focus degree than at a first in-focus degree, the second in-focus degree being lower than the first in-focus degree.

4. An image pickup apparatus comprising:

an image pickup unit adapted to pick up an image and output a video signal, the image being formed by an image-pickup optical system including a focus lens;

an object detection unit adapted, based on the video signal output from said image pickup unit, to detect object information that represents an object area on an imaging screen and likelihood of being an object;

a determination unit adapted to determine whether the likelihood of being an object detected by said object detection unit satisfies a predetermined condition varied according to an imaging state; and a control unit adapted to control a focus adjustment based on a video signal in the object area in a case where it is determined by said determination unit that the likelihood of being an object satisfies the predetermined condition, wherein the imaging state is represented by object brightness, and the predetermined condition is varied so as to be more easily satisfied at a second object brightness than at a first object brightness, the second objection brightness being lower than the first object brightness.

5. An image pickup apparatus comprising:

an image pickup unit adapted to pick up an image and output a video signal, the image being formed by an image-pickup optical system including a focus lens;

an object detection unit adapted, based on the video signal output from said image pickup unit, to detect object information that represents an object area on an imaging screen and likelihood of being an object;

a determination unit adapted to determine whether the likelihood of being an object detected by said object detection unit satisfies a predetermined condition varied according to an imaging state; and a control unit adapted to control a focus adjustment based on a video signal in the object area in a case where it is determined by said determination unit that the likelihood of being an object satisfies the predetermined condition, wherein the imaging state is represented by whether a zooming operation is being performed, and the predetermined condition is varied so as to be more easily satisfied when the zooming operation is being performed than when the zooming operation is not being performed.

6. An image pickup apparatus comprising:

an image pickup unit adapted to pick up an image and output a video signal, the image being formed by an image-pickup optical system including a focus lens;

an object detection unit adapted, based on the video signal output from said image pickup unit, to detect object information that represents an object area on an imaging screen and likelihood of being an object;

a determination unit adapted to determine whether the likelihood of being an object detected by said object detection unit satisfies a predetermined condition varied according to an imaging state; and a control unit adapted to control a focus adjustment based on a video signal in the object area in a case where it is determined by said determination unit that the likelihood of being an object satisfies the predetermined condition, wherein the predetermined condition is varied so as to be more easily satisfied when the object is positioned around a center of the imaging screen than when the object area is positioned away from the center of the imaging screen.

7. An auto-focus detection method for an image pickup apparatus, comprising:

an image pickup step of picking up an image and outputting a video signal, the image being formed by an image-pickup optical system including a focus lens;

an object detection step of, based on the video signal output in said image pickup step, detecting object information that represents an object area on an imaging screen and likelihood of being an object;

a determination step of determining whether the likelihood of being an object detected in said object detection step satisfies a predetermined condition varied according to an imaging state of the image pickup apparatus; and a control step of controlling a focus adjustment based on a video signal in the object area in a case where it is determined in said determination step that the likelihood of being an object satisfies the predetermined condition, wherein the imaging state is represented by focal distance, and the predetermined condition is varied so as to be more easily satisfied at a second focal distance than at a first focal distance, the second focal distance being longer than the first focal distance.

8. An auto-focus detection method for an image pickup apparatus, comprising:

an image pickup step of picking up an image and outputting a video signal, the image being formed by an image-pickup optical system including a focus lens;

an object detection step of, based on the video signal output in said image pickup step, detecting object information that represents an object area on an imaging screen and likelihood of being an object;

a determination step of determining whether the likelihood of being an object detected in said object detection step satisfies a predetermined condition varied according to an imaging state of the image pickup apparatus; and a control step of controlling a focus adjustment based on a video signal in the object area in a case where it is determined in said determination step that the likelihood of being an object satisfies the predetermined condition, wherein the imaging state is represented by shutter speed, and the predetermined condition is varied so as to be more easily satisfied at a second shutter speed than at a first shutter speed, the second shutter speed being slower than the first shutter speed.

9. An auto-focus detection method for an image pickup apparatus, comprising:

an image pickup step of picking up an image and outputting a video signal, the image being formed by an image-pickup optical system including a focus lens;

an object detection step of, based on the video signal output in said image pickup step, detecting object information that represents an object area on an imaging screen and likelihood of being an object;

a determination step of determining whether the likelihood of being an object detected in said object detection step satisfies a predetermined condition varied according to an imaging state of the image pickup apparatus; and a control step of controlling a focus adjustment based on a video signal in the object area in a case where it is determined in said determination step that the likelihood of being an object satisfies the predetermined condition, wherein the imaging state is represented by in-focus degree of the image-pickup optical system to the object, and the predetermined condition is varied so as to be more easily satisfied at a second in-focus degree than at a first in-focus degree, the second in-focus degree being lower than the first in-focus degree.

10. An auto-focus detection method for an image pickup apparatus, comprising:

an image pickup step of picking up an image and outputting a video signal, the image being formed by an image-pickup optical system including a focus lens;

an object detection step of, based on the video signal output in said image pickup step, detecting object information that represents an object area on an imaging screen and likelihood of being an object;

a determination step of determining whether the likelihood of being an object detected in said object detection step satisfies a predetermined condition varied according to an imaging state of the image pickup apparatus; and a control step of controlling a focus adjustment based on a video signal in the object area in a case where it is determined in said determination step that the likelihood of being an object satisfies the predetermined condition, wherein the imaging state is represented by object brightness, and the predetermined condition is varied so as to be more easily satisfied at a second object brightness than at a first object brightness, the second objection brightness being lower than the first object brightness.

11. An auto-focus detection method for an image pickup apparatus, comprising:

an image pickup step of picking up an image and outputting a video signal, the image being formed by an image-pickup optical system including a focus lens;

an object detection step of, based on the video signal output in said image pickup step, detecting object information that represents an object area on an imaging screen and likelihood of being an object;

a determination step of determining whether the likelihood of being an object detected in said object detection step satisfies a predetermined condition varied according to an imaging state of the image pickup apparatus; and a control step of controlling a focus adjustment based on a video signal in the object area in a case where it is determined in said determination step that the likelihood of being an object satisfies the predetermined condition, wherein the imaging state is represented by whether a zooming operation is being performed, and the predetermined condition is varied so as to be more easily satisfied when the zooming operation is being performed than when the zooming operation is not being performed.

12. An auto-focus detection method for an image pickup apparatus, comprising:

an image pickup step of picking up an image and outputting a video signal, the image being formed by an image-pickup optical system including a focus lens;

an object detection step of, based on the video signal output in said image pickup step, detecting object information that represents an object area on an imaging screen and likelihood of being an object;

a determination step of determining whether the likelihood of being an object detected in said object detection step satisfies a predetermined condition varied according to an imaging state of the image pickup apparatus; and a control step of controlling a focus adjustment based on a video signal in the object area in a case where it is determined in said determination step that the likelihood of being an object satisfies the predetermined condition, wherein the predetermined condition is varied so as to be more easily satisfied when the object is positioned around a center of the imaging screen than when the object area is positioned away from the center of the imaging screen.

* * * * *